US009364872B2

(12) United States Patent
Soller et al.

(10) Patent No.: US 9,364,872 B2
(45) Date of Patent: Jun. 14, 2016

(54) SINGLE-DOSE APPLICATOR AND METHOD

(71) Applicant: S.C. Johnson & Son, Inc., Racine, WI (US)

(72) Inventors: Douglas A. Soller, Racine, WI (US); William J. Rice, Antioch, IL (US); Cory J. Nelson, Racine, WI (US); Michael E. Klinkhammer, Racine, WI (US)

(73) Assignee: S. C. Johnson & Son, Inc., Racine, WI (US)

( * ) Notice: Subject to any disclaimer, the term of this patent is extended or adjusted under 35 U.S.C. 154(b) by 777 days.

(21) Appl. No.: 13/673,653

(22) Filed: Nov. 9, 2012

(65) Prior Publication Data

US 2013/0068267 A1 Mar. 21, 2013

Related U.S. Application Data

(63) Continuation-in-part of application No. 12/853,362, filed on Aug. 10, 2010, now Pat. No. 8,794,293, and a continuation-in-part of application No. 29/424,844, filed on Jun. 15, 2012, now Pat. No. Des. 690,790, and (Continued)

(51) Int. Cl.
*E03D 9/02* (2006.01)
*B29C 65/48* (2006.01)
(Continued)

(52) U.S. Cl.
CPC .......... *B08B 7/0028* (2013.01); *B65D 25/2826* (2013.01); *B65D 55/0818* (2013.01);
(Continued)

(58) Field of Classification Search
CPC ..................... B65D 2575/565; B65D 55/0818; B65D 75/527; B65D 2543/00194; B65D 2543/00351; B65D 2543/00527; B65D 2543/00546; B65D 43/0202; B65D 25/2826; B65D 75/325; B29C 66/43; B32B 37/26; Y10T 156/17; Y10T 156/1788; Y10T 156/179; Y10T 156/1798; Y10T 156/18; B08B 7/0028; C11D 17/041; E03D 9/022; E03D 2009/026; B05D 1/26
USPC .................. 156/574, 575, 578, 579; 134/22.1
See application file for complete search history.

(56) References Cited

U.S. PATENT DOCUMENTS 3,386,793 A 6/1968 Stanton
3,860,348 A 1/1975 Doyle
(Continued)

FOREIGN PATENT DOCUMENTS

DE 10222009 A1 12/2003
EP 2141221 A1 1/2010
(Continued)

OTHER PUBLICATIONS

PCT/US2013/068748 International Search Report and Written Opinion dated Apr. 17, 2014.

(Continued)

*Primary Examiner* — Sonya Mazumdar

(57) ABSTRACT

An applicator, related applicator system, and a method for delivering a self-adhesive material are provided. The applicator includes an outer surface, and an inner surface opposite the outer surface. The inner surface of the applicator defines a void that is operable to receive the self-adhesive material. At least a portion of the inner surface releasably adhere the applicator side of the self-adhesive material where the adhesive force between the portion of the inner surface and the applicator side being less than adhesive force between the substrate and the substrate side. The applicator is used by placing the applicator in contact with a substrate, pressing the applicator against the substrate such that the self-adhesive material adheres to the substrate, and releasing the applicator from the substrate.

30 Claims, 14 Drawing Sheets

Related U.S. Application Data a continuation-in-part of application No. 29/424,847, filed on Jun. 15, 2012, now Pat. No. Des. 690,791, and a continuation-in-part of application No. 29/424,849, filed on Jun. 15, 2012, now Pat. No. Des. 690,792.

(51) Int. Cl.

| | |
|---|---|
| ***B29C 65/56*** | (2006.01) |
| ***B32B 37/12*** | (2006.01) |
| ***B32B 37/14*** | (2006.01) |
| ***B32B 37/10*** | (2006.01) |
| ***B08B 7/00*** | (2006.01) |
| ***B65D 75/52*** | (2006.01) |
| ***B65D 55/08*** | (2006.01) |
| ***B65D 25/28*** | (2006.01) |
| ***B65D 75/32*** | (2006.01) |
| ***C11D 17/04*** | (2006.01) |
| *B05D 1/26* | (2006.01) |

(52) U.S. Cl.

CPC ............ *B65D75/325* (2013.01); *B65D 75/527* (2013.01); *C11D 17/041* (2013.01); *E03D 9/022* (2013.01); *B05D 1/26* (2013.01); *B65D 2575/565* (2013.01); *E03D 2009/026* (2013.01)

(56) References Cited

U.S. PATENT DOCUMENTS

| | | | |
|---|---|---|---|
| 4,254,871 | A | 3/1981 | Poore |
| 4,362,000 | A | 12/1982 | Poore |
| 4,963,045 | A | 10/1990 | Willcox |
| 5,019,346 | A | 5/1991 | Richter et al. |
| 5,312,624 | A | 5/1994 | Richter et al. |
| 6,037,319 | A | 3/2000 | Dickler et al. |
| 6,136,776 | A | 10/2000 | Dickler et al. |
| D436,532 | S | 1/2001 | Richardson |
| 6,378,274 | B1 | 4/2002 | Harbour |
| 6,499,597 | B2 | 12/2002 | Edwards et al. |
| D479,097 | S | 9/2003 | Willis |
| 6,667,286 | B1 | 12/2003 | Dettinger et al. |
| 6,898,921 | B2 | 5/2005 | Duffield |
| 7,105,478 | B2 | 9/2006 | Guzmann et al. |
| 7,108,440 | B1 | 9/2006 | Gruenbacher et al. |
| 7,189,686 | B2 | 3/2007 | Burt et al. |
| 7,243,798 | B2 | 7/2007 | Buss |
| 7,273,841 | B2 | 9/2007 | Colurciello et al. |
| 7,424,797 | B2 | 9/2008 | Duffield |
| 7,448,496 | B2 | 11/2008 | Williams-Hartman |
| 7,469,519 | B2 | 12/2008 | Barthel et al. |
| 7,520,406 | B2 | 4/2009 | Jaichandra et al. |
| 7,625,856 | B2 | 12/2009 | Burt et al. |
| D623,798 | S | 9/2010 | Huynh |
| 2002/0195369 | A1 | 12/2002 | Bergman |
| 2004/0011693 | A1 | 1/2004 | Prenger et al. |
| 2004/0065679 | A1 | 4/2004 | Peuker et al. |
| 2006/0213801 | A1 | 9/2006 | Karaoren et al. |
| 2006/0260973 | A1 | 11/2006 | Macinnes et al. |
| 2007/0053737 | A1 | 3/2007 | Morris et al. |
| 2008/0003052 | A1 | 1/2008 | Lee et al. |
| 2008/0057020 | A1 | 3/2008 | Evers et al. |
| 2008/0058239 | A1 | 3/2008 | Evers et al. |
| 2008/0058240 | A1 | 3/2008 | Evers et al. |
| 2008/0058241 | A1 | 3/2008 | Sarcinelli et al. |
| 2008/0092282 | A1 | 4/2008 | Altmann et al. |
| 2008/0099041 | A1 | 5/2008 | Evers et al. |
| 2008/0255017 | A1 | 10/2008 | Dettinger et al. |
| 2008/0313795 | A1 | 12/2008 | Lu |
| 2009/0188831 | A1 | 7/2009 | Blackman |
| 2009/0194451 | A1 | 8/2009 | Leiner et al. |
| 2009/0235443 | A1 | 9/2009 | Arora et al. |
| 2012/0037301 | A1 | 2/2012 | Rice et al. |
| 2013/0095238 | A1 | 4/2013 | Delgigante et al. |

FOREIGN PATENT DOCUMENTS

| | | | |
|---|---|---|---|
| EP | 1901972 | B1 | 3/2010 |
| EP | 2281756 | A1 | 2/2011 |
| WO | WO03097947 | A1 | 11/2003 |
| WO | WO2011/135330 | A1 | 11/2011 |
| WO | WO2012017276 | A1 | 2/2012 |
| WO | 2013054124 | | 4/2013 |

OTHER PUBLICATIONS

PCT/US2011/001411 International Search Report dated Nov. 30, 2011.

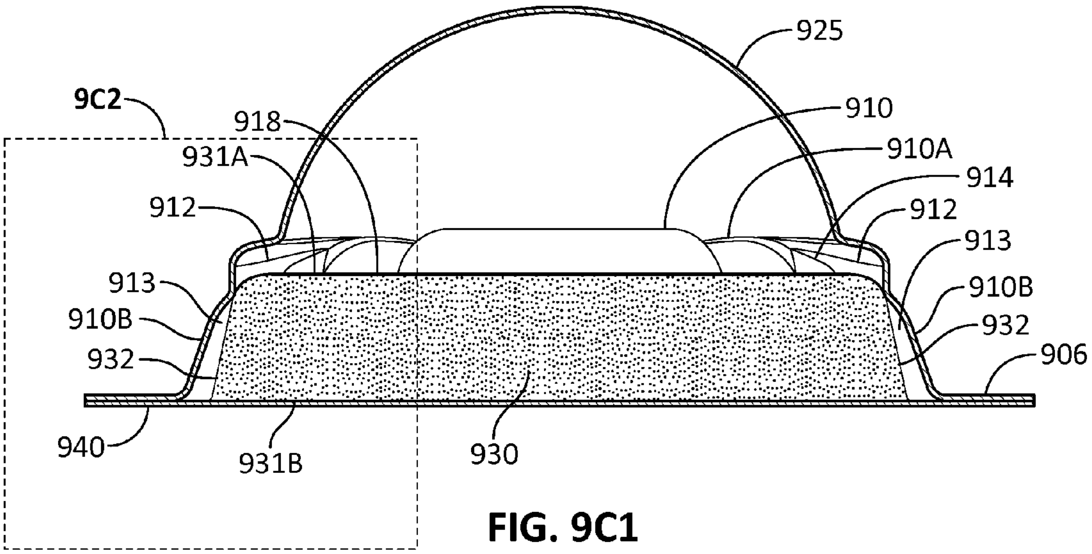
FIG. 9C1
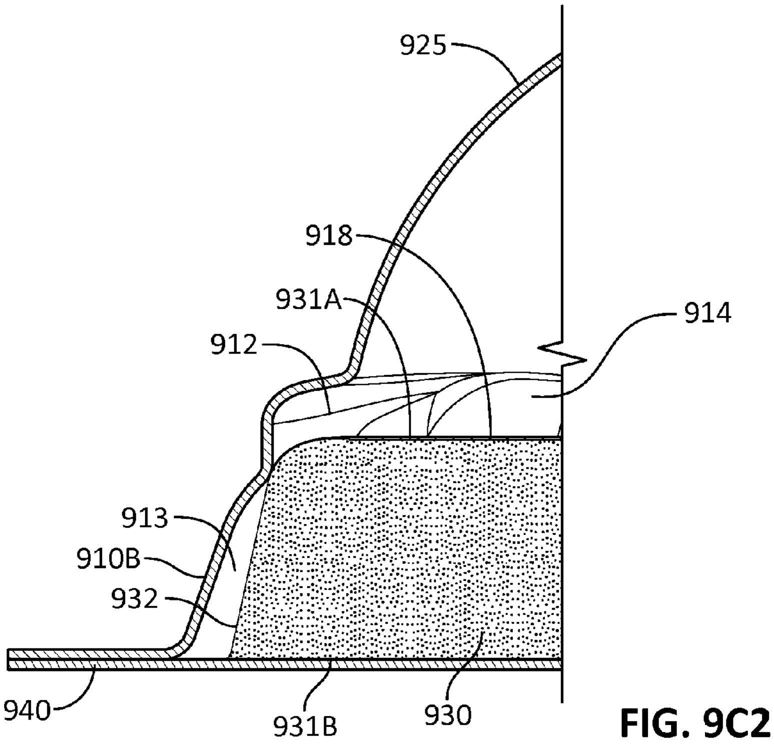
FIG. 9C2

SINGLE-DOSE APPLICATOR AND METHOD

This application is a continuation-in-part of each of the following: U.S. patent application Ser. No. 12/853,362 filed on Aug. 10, 2010, U.S. patent application Ser. No. 29/424,844 filed on Jun. 15, 2012, U.S. patent application Ser. No. 29/424,847 filed on Jun. 15, 2012, and U.S. patent application Ser. No. 29/424,849 filed on Jun. 15, 2012. The entire disclosures of U.S. patent application Ser. Nos. 12/853,362, 29/424,844, 29/424,847, and 29/424,849 are hereby incorporated fully by reference in their entirety.

TECHNICAL FIELD

The present invention generally relates to applicators and methods for delivering a self-adhesive material. More specifically, applicators and methods are provided for delivery of a self-adhesive, particularly the delivery of a single dose of a sanitary agent to a surface, such as the surface of a toilet.

BACKGROUND

Various agents for cleaning, sanitizing, and deodorizing surfaces of bathroom appliances such as toilets are known and have been widely available to consumers in the form of solids, pastes, gels, powders and liquids. Liquid formulations commonly delivered in squeeze bottles allow for periodic cleaning of the appliance, but require a consumer to reapply the sanitary agent each time the appliance is to be cleaned. Other products that demand less time by the consumer allow for automatic or continuous cleaning of the appliance. For example, automatic or continuous cleaning is afforded by providing sanitary agents in the form of solid blocks or by suspending the sanitary agent in baskets that hang from the appliance. The disadvantage of such modes of delivery is that to place the block or basket, the consumer is required to directly handle the sanitary agent or to directly contact an un-hygienic surface of the appliance.

Other agents such as self-adhesive materials adhere to substrates such as surfaces of bathroom appliances. For example, self-adhesive sanitary agents allow for direct application of the sanitary agent to a surface, and thus provide automatic or continuous cleaning of an appliance while overcoming the drawbacks of previous forms. Dispensers for self-adhesive materials and agents are cumbersome mechanical apparatus that contain an inventory of agent that can be delivered in a series of controlled unitized doses. The dispenser and initial inventory of agent represent an upfront investment for the consumer. Additionally, such dispensers can be difficult to properly operate and can waste product by leaving behind residual agent inventory after the device is used. Accordingly, there is a need for an applicator for the delivery of smaller or single doses of self-adhesive agents, that is easy to use and avoids the problems of more sophisticated complex multiple dose dispensers.

SUMMARY

One aspect of the invention provides an applicator for delivering a self-adhesive material having an applicator side and a substrate side to a substrate. The applicator includes an outer surface, and an inner surface opposite the outer surface. The inner surface of the applicator defines a void that is operable to receive the self-adhesive material. At least a portion of the inner surface releasably adhere the applicator side of the self-adhesive material where the adhesive force between the portion of the inner surface and the applicator side being less than adhesive force between the substrate and the substrate side.

Another aspect of the invention provides an applicator system where the applicator has an outer surface, and an inner surface opposite the outer surface. The inner surface defines a void with a self-adhesive material having an applicator side and a substrate side disposed inside. A cover is removably attached to a rim that is disposed about a periphery of the void. At least a portion of the inner surface is operable to releasably adhere the applicator side of the self-adhesive material where the adhesive force between the portion of the inner surface and the applicator side being less than adhesive force between the substrate and the substrate side of the self-adhesive material.

In yet another aspect of the invention, a method of using an applicator for delivering a self-adhesive material to a surface is provided. The method comprises providing an applicator with a portion of an inner surface that releasably adheres the self-adhesive material; placing the applicator in contact with a substrate with the inner surface facing the substrate; pressing the applicator against the substrate to adhere the self-adhesive material to the substrate; and removing the applicator from the substrate.

In another aspect, an applicator comprises an outer surface having a handle configured to apply a self-adhesive material, and an inner surface having an inner recess configured to receive the self-adhesive material. When the self-adhesive material is placed into the inner recess, the self-adhesive material and the inner surface may form a gap between the applicator and the self-adhesive material. The self-adhesive material can be configured to be placed into contact with the inner surface when the self-adhesive material is placed into contact with a surface. The applicator can also include a flange extending around the periphery of the applicator, and the flange may be configured to receive a cover. The flange may also include an angled portion defining a location for the user to remove the cover to expose the self-adhesive material to a surface. The inner surface of the applicator can be configured to shape the self-adhesive material when the self-adhesive material is placed into contact with the surface. The inner surface of the applicator can include an upper region defining a contour that is initially offset from the self-adhesive material, and the upper region is configured to at least partially imprint the contour onto the self-adhesive material when the self-adhesive material is applied to the surface.

In another exemplary embodiment, a cleaning apparatus is disclosed. The cleaning apparatus can include a removable self-adhesive material configured to adhere to a surface to be cleaned. The self-adhesive material defines a first surface and a second surface. The cleaning apparatus can also include an applicator comprising an outer surface having a handle configured to apply the self-adhesive material to the surface and an inner surface having an inner recess configured to receive the self-adhesive material. An adhesive force between the first surface of the self-adhesive material and the applicator can be configured to be greater than the weight of the self-adhesive material. An adhesive force between the surface to be cleaned and the second surface of the self-adhesive material can be configured to be greater than the adhesive force between the first surface of the self-adhesive material and the applicator. The adhesive force between surface to be cleaned and the second surface of the self-adhesive material can be configured to remove the self-adhesive material from the applicator. The inner surface of the applicator can be configured to shape the self-adhesive material when the self-adhesive material is placed into contact with the surface.

In another exemplary embodiment, the inner surface of the applicator can include an upper region defining a contour that is initially offset from the self-adhesive material, and the upper region is configured to at least partially imprint the contour onto the self-adhesive material when the self-adhesive material is applied to the surface. The self-adhesive material may further comprise a release layer placed on a first surface of the adhesive material. The release layer can be placed on a portion of the first surface of the adhesive material and exposes an edge portion of the adhesive material. Alternatively, at least one circular opening can be formed into the release layer to expose a portion of the first surface of the adhesive material.

In another exemplary embodiment a method for forming a cleaning apparatus is disclosed. The method comprises providing a removable self-adhesive material and configuring the self-adhesive material to adhere to a surface to be cleaned, the self-adhesive material defining a first surface and a second surface. The method may further comprise providing an applicator comprising an outer surface having a handle and configuring the applicator to apply the self-adhesive material to the surface to be cleaned, and providing an inner surface in the applicator having an inner recess configured to receive the self-adhesive material. The method may further comprise placing the self-adhesive material into the inner recess of the applicator such that the self-adhesive material and the inner surface form an air gap between the applicator and the self-adhesive material.

The example method may further comprise configuring the self-adhesive material to be placed into contact with the inner surface of the applicator when the self-adhesive material is placed into contact with a surface. The method may further comprise providing the applicator with a flange extending around the periphery of the applicator and configuring the flange to receive a cover and providing the flange with an angled portion defining a location for the user to remove the cover to expose the self-adhesive material to a surface and configuring the inner surface of the applicator to shape the self-adhesive material when the self-adhesive material is placed into contact with a surface. The method may further comprise providing the inner surface of the applicator with an upper region defining a contour that is initially offset from the self-adhesive material, and the upper region is configured to at least partially imprint the contour onto the self-adhesive material when the self-adhesive material is applied to the surface.

The example method can further include providing the self-adhesive material with a release layer placed on a first surface of the adhesive material; placing the release layer on a portion of the first surface of the adhesive material; and exposing an edge portion of the adhesive material with the release layer or providing at least one circular opening in the release layer to expose the portion of the first surface of the adhesive material.

BRIEF DESCRIPTION OF THE DRAWINGS

FIG. 9C1 depicts a cross-sectional view of the applicator of FIG. 9A;

FIG. 9C2 depicts an enlarged view of the cross-sectional view FIG. 9C1;

DETAILED DESCRIPTION

In the following description of various example structures in accordance with the invention, reference is made to the accompanying drawings, which form a part hereof, and in which are shown by way of illustration of various structures in accordance with the invention. Additionally, it is to be understood that other specific arrangements of parts and structures may be utilized, and structural and functional modifications may be made without departing from the scope of the present invention. Also, while the terms "top" and "bottom" and the like may be used in this specification to describe various example features and elements of the invention, these terms are used herein as a matter of convenience, e.g., based on the example orientations shown in the figures and/or the orientations in typical use. Nothing in this specification should be construed as requiring a specific three dimensional or spatial orientation of structures in order to fall within the scope of this invention.

Figure 1A:
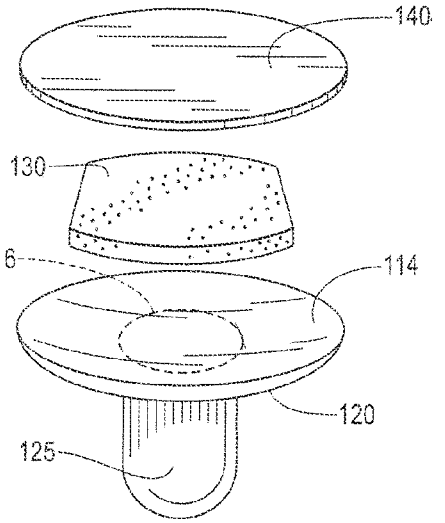
FIGS. 1A and 1B are an exploded view and illustration of an applicator for delivering a self-adhesive material to a substrate in accordance with the invention.
Figure 1B:
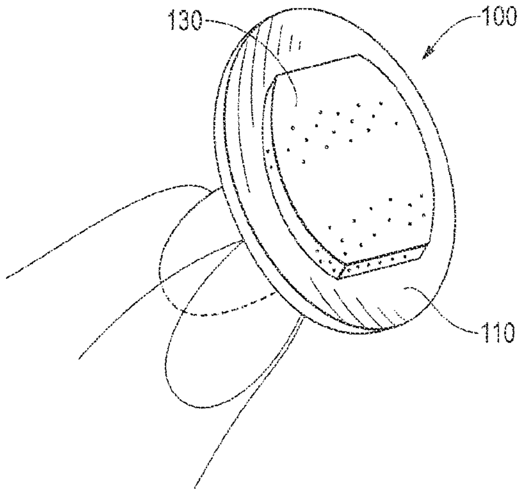

An applicator 100 having an inner surface 110 that defines a void 114 for holding a self-adhesive material 130 is shown in FIGS. 1A and 1B. The applicator includes an outer surface

120 and a void 114. As shown, in FIGS. 1A and 1B, the void 114 is formed by the inner surface 110 of the applicator. The outer surface and void elements can be individually formed to facilitate the handling and delivery of the self-adhesive material. As for the materials of construction, the applicator can be formed from either a single material or various different materials. For example, the outer surface can be made of a rigid material this is formed to facilitate the holding, moving, manipulating, and so forth of the applicator while the inner surface can be made of material designed for the holding and delivery of the self-adhesive material. In some embodiments the outer surface 120 may further include a handle 125. In one embodiment, the handle 125 extends essentially transversely from the outer surface 120, and as shown in FIG. 1A, is adapted to be grasped between a finger and thumb. Optionally, the outer surface 120 can be formed to include the optional handle 125. The handle 125 facilitates maneuvering of the applicator into position for delivery of the self-adhesive material 130 to the surface. Such a handle can be useful for the attaching self-adhesive material below a water line, such as in a toilet or tank of liquid. As shown in FIG. 1A, the outer surface 120, the inner surface 110, and the handle 125 are formed together as a single unitary device.

Generally, the void is an open-ended volume that is typically concave in shape so as to allow for the acceptance and delivery of a relatively small or single dose of self-adhesive material. Non-limiting examples of void shapes include relatively uniform geometric shapes such as a cylinder, polyhedron, sphere, ellipsoid, any rectilinear volume, and so forth The inner surface 110 has a portion 116 that is adapted to receive and adhere a self-adhesive material 130. Self-adhesive material 130 can be a paste, gel or the like that is adapted for applying directly to a substrate. In some embodiments, the self-adhesive material 130 may be a sanitary agent that may be used to clean, disinfect or odorize a substrate. The self-adhesive material 130 can sanitize the substrate by disintegrating and releasing cleaning, disinfecting and/or deodorizing substances when contacted with a rinse liquid. Examples of self-adhesive material 130 that may be delivered using the applicators of this invention are disclosed in U.S. Patent Application No. 2008/0190457, entitled "Self-sticking Disintegrating Block for Toilet or Urinal" to Veltman et al., published on Aug. 14, 2008; U.S. Patent Application No. 2009/0215661 entitled "Cleaning Composition Having High Self-Adhesion and Providing Residual Benefits" to Klinkhammer et al., published on Aug. 27, 2009; and U.S. Pat. No. 6,667,286 entitled "Adhesive sanitary agent" issued to Dettinger et al. on Dec. 23, 2003, the disclosures of which are incorporated herein by reference. As disclosed in the prior art, formulations of the self-adhesive material can include compositions that are detersive, cleansing, fragrancing, disinfecting, septic, corrosive, enzymatic, and so forth.

In one embodiment, the self-adhesive material attaches directly to a wall of a toilet bowl or urinal, either above or below the water-line and in the stream of flush water, by pressing the material to the wall. Accordingly, a non-limiting example of self-adhesive material includes 25% to 99% of surfactants, and 1% to 25% of a liquid component, wherein all percentages are percent by weight of the total composition of the material. The surfactants include one or more solid surfactants, and optionally one or more liquid surfactants. The surfactants may be anionic, nonionic, cationic and/or amphoteric depending on the cleaning properties desired. The liquid component may selected from water, surfactants, glycerin, fragrances, colorants, alcohols, binders, lime-scale removing agents, hydrotropes, solvents, chelating agents, dispersing agents, and mixtures thereof. The self-adhesive material may further include a filler. The self-adhesive material contains proportions of the above-identified ingredients such that the material has a mass that has a "sticky" consistency. Preferably, the material does not flow, i.e., the block is not viscous. The ratio of the two primary ingredients, the solid surfactant and the liquid component, depends on the liquid and its penetration (liquid absorption into the solid) and the solubility of the solid surfactant in the liquid(s). For a liquid fragrance, it is desirable to absorb more than solubilize. Although the addition of water is not preferred, small amounts can be tolerated.

Generally, self-adhesive material refers to any gel, paste, wax, solid, or the like that may adhere to, or otherwise provide a self-support from, a surface or substrate. By self-support, it is meant that a material will not require any additional device, or other mechanical means, to maintain and/or support and/or otherwise suspend the material in a fixed place, particularly in light of natural gravitational forces acting on the material. Substrates to which the self-adhesive material 130 can be delivered are numerous and diverse and can include hard surfaces that are both natural and man-made. In one embodiment the substrate is the surface of a toilet above the water line. For example, the self-adhesive sanitary material adheres to the side of a toilet bowl underneath the rim. Other non-limiting examples of surfaces to which self-adhesive material adheres can include a ceramic surface, such as a toilet bowl or a sink, glass, metal, plastic, stone, and so forth. Generally, self-adhesive material does not include a separate layer of glue which tends to leave an unwanted residue behind on the surface. Typically, the self-adhesive material is released from the surface by any number of physical and chemical processes such as being washed away, dissolved, devolatilized, vaporized, reacted, and so forth so as to leave no residue on the surface. For example, a self-adhesive sanitary material on an inner toilet bowl surface is washed away from a surface after being subject to one or more flushes.

Without being bound to any particular theory the relative strength of adhesive force between self-adhesive material and various substrates and surfaces is controlled by the magnitude of the inter-molecular forces of attraction, i.e., between the material and the surface or substrate. The higher the magnitude of this attraction, the greater will be the strength of the adhesive force. The magnitude of this attraction will depend upon (1) the nature of the molecules contained within the material and the surface or substrate and (2) the distance between the contacting material and the surface or substrate during use. In general, the closer the distance, the greater will be the magnitude of this attraction. Surface smoothness or roughness can affect attraction such that the required attraction can be adjusted by appropriate control of the rheology of the self-adhesive material. In other words, the viscoelastic properties of the material should fall within a certain range for the material to be effective. For example, a stiff or non-malleable material can result in air gaps between the material and the surface or substrate which effectively lowers adhesive force strength. Further, a fluid or soft material can flow, drip, or drain down the surface and prevent retention of a reasonable volume of the material within a desired area of the surface or substrate. Typically, the self-adhesive material is viscous semi-solid having viscoelastic properties that can be measured using a penetrometer and/or appropriate rheometric techniques. A "Stickiness Test" as described in U.S. Pat. Application No. 2008/0190457 titled "Self-sticking Disintegrating Block for Toilet or Urinal" is another useful technique for determining optimal adhesive force to surfaces and other substrates. Once the various properties of the self-adhesive material are determined, a range can be established for the rheology of the material that can lead to good adhesion.

In one embodiment the adhesive properties of the self-adhesive material 130 are controlled such that adhesive force of the self-adhesive material 130 to the surface portion 116 is less than adhesive force of the self-adhesive material 130 to a substrate. In this way, portion 116 readily releases the self-adhesive material when self-adhesive material 130 comes in contact with a surface or a substrate such as the inside surface of a toilet bowel.

Referring to FIG. 1A, the inner surface 110 defines a void 114 for accepting the self-adhesive material 130 which adheres to the portion 116. As shown, the void formed by inner surface has a generally concave shape so the self-adhesive material 130 fits within the void. In one embodiment a cover 140 attaches to a periphery surrounding the void and seals the self-adhesive material within the void.

Optionally, indicia can be included on the various surfaces of the applicator and related components. The indicia can be used to convey a wide variety of information including, but not necessarily limited to, health, safety, environmental, use, brand identification and so forth.

Use of the applicator 100 as shown in FIG. 1B typically involves grasping the applicator 100 between a finger and thumb. With the cover 140 removed the self-adhesive material 130 is exposed within the void 110 and is ready to be delivered to a substrate. To position the applicator for delivery of the exposed self-adhesive material 130, a finger and thumb grasp handle 125 and maneuver the applicator 100 into contact with a substrate. Applicator 100 is positioned so that the self-adhesive material 130 can be brought into contact with the substrate. For example, the applicator can be used to deliver a single dose of the self-adhesive material to a surface of a toilet by placing the applicator 100 with self-adhesive material 130 in contact with the surface of the toilet above a water line.

Figure 2A:
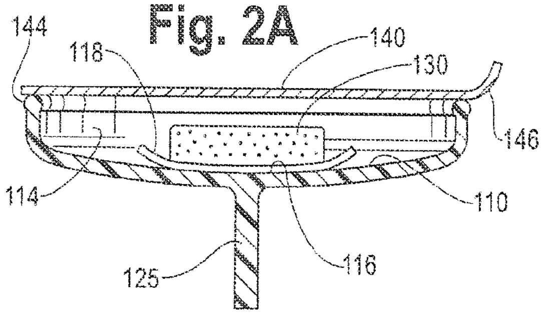
FIGS. 2A and 2B are cross-sectional views of an applicator having an inner surface that defines a void for holding a self-adhesive material in accordance with the invention.
Figure 2B:
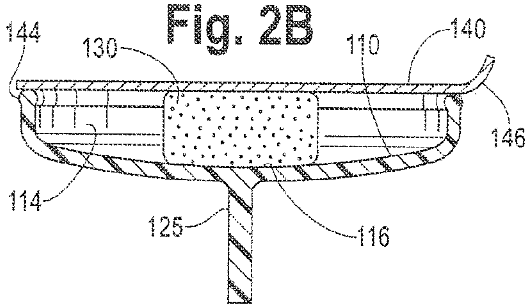

Cross-sectional views of an applicator 100 having a portion 116 of inner surface 110 for holding a self-adhesive material 130 are shown in FIGS. 2A and 2B. In yet another embodiment, the inner surface 110 includes a rim 144 that encircles the void 114 formed by inner surface 110. The rim 144 is designed to facilitate removable attachment of the cover 140 to the rim 144 so as to enclose the self-adhesive material 130. The cover 140 protectively seals the self-adhesive material 130 inside the void 114. Prior to use of the applicator the cover 140 is detached from the rim 144 to expose the self-adhesive material 130 disposed in void 114. Cover 140 is made from material that provides a barrier against moisture and odor or fragrance. Typically the cover 140 is made of multilayer foil, a metalized barrier film such as a metal foil for example aluminum foil, plastic film, or combinations thereof. Examples of polymers used to form plastic films include, but are not limited to, polyethylene, polypropylene, polyethylene terephthalate, polybutylene terphthalate, polyethylene naphthalate, polyesters, polycarbonates, polystyrene, acrylics, polyurethanes, polyvinyl chloride, polyvinyl fluoride, and mixtures and copolymers thereof. In one embodiment, the cover 140 can be formed to have a tab 146 that can used to facilitate the removal of the cover.

A non-limiting example of material used to form or make the applicator 100 and related components such as the cover 140 can also include biodegradable or other environmentally compatible materials. The applicator components can be made of single-layer sheets or multi-layer laminate sheets such as the combination of barrier foil with plastic. Optionally, the materials can be transparent, translucent, or opaque as deemed desirable for various product supply, packaging, marketing, and various other business considerations. A non-limiting example of material includes heat sealable thermoplastic materials such as polyethylene or polypropylene. Layered laminates having generally a sandwich construction can include any combination or order of polyethylene, cellophane, paper, polyester, and so forth including variations thereof. Selection of materials, and the thickness thereof, is determined by the nature of the material being packaged. The selection of biodegradable materials generally includes consideration of decomposition in both natural aerobic and anaerobic environments. More specifically for plastics material, biodegradability is achieved by materials that can be metabolized by microorganisms into inert material having minimal impact on the environment. For biodegradation in an aerobic environment a plastic can be selected based on ASTM D6400-04 Standard Specification for Compostable Plastics, ASTM D6868-03 Standard Specification for Biodegradable Plastics Used as Coatings on Paper and Other Compostable Substrates, and the ASTM D7081-05 Standard Specification for Non-Floating Biodegradable Plastics in the Marine Environment. For biodegradation in an anaerobic environment a plastic can be selected based on ASTM D5511-02 Standard Test Method for Determining Anaerobic Biodegradation of Plastic Materials Under High-Solids Anaerobic-Digestion Conditions or ASTM D5526-94 (2002) Standard Test Method for Determining Anaerobic Biodegradation of Plastic Materials Under Accelerated Landfill Conditions.

In addition, biodegradable or other environmentally compatible materials can include water-soluble material. Without being limited by any particular theory, water-soluble materials are materials that disintegrate or dissolve in the presences of water. Non-limiting examples of water-soluble material include, but is not necessarily limited to water-soluble polymers, particularly polymers that are useful in film forming, such as poly-vinyl alcohol, cellulose ether, and so forth either individually or in various combinations. As generally known in the art, various additives can be incorporated into the water-soluble polymers to alter disintegration and dissolution as desired.

In one embodiment and as shown in FIG. 2B, the cover 140 protectively seals the substrate surface of the self-adhesive material 130. Such protection is desirable when the environment affects the adhesive properties of the self-adhesive material such as the loss of adhesive force due to oxidation, moisture, and so forth. For such a cover, it is desirable that the adhesive force of the self-adhesive material 130 to the cover 140 be less than the adhesive force of the self-adhesive material 130 to the surface portion 116. In this way, cover 140 may be detached from the rim 144 such that the self-adhesive material 130 remains in the void 114.

In another embodiment, surface portion 116 is optionally the surface a of release layer 118 that is attached to the inner surface 110. In this way, the optional release layer 118 can be used to control adhesive force of the self-adhesive material 130. If the properties of the inner surface do not allow proper adhesive force with the self-adhesive material, the release layer 118 can be attached to the inner surface to provide a surface portion 116 that allows for the desired adhesive force with the self-adhesive material 130. For example, the optional release layer 118 may be made of a wax paper, silicone coated paper, and so forth that is glued to the inner surface 110.

Optionally, the release layer 118 can be formed to release from the inner surface 110 and remain attached to the self-adhesive material 130 when the self-adhesive material is applied to the hard surface. In such an embodiment, the release layer 130 can provide a protective layer or backing for the self-adhesive material until the appliance with the hard surface is put into use such as by flushing in the case of a toilet. When used in this manner, the release layer 118 is desirably formed of biodegradable or other environmentally compatible materials. More specifically, the release layer can be formed from water-soluble material as describe herein which upon contact with water, such as through flushing, will dissolve or disintegrate to fully expose the self-adhesive material.

In yet another embodiment, the adhesive properties of the portion 116 are controlled by the use of a coating to modify the adhesive properties of the portion 116. Thus, coatings can be used to control adhesive force. For example, application of silicone to the portion 116 reduces adhesive force and makes the self-adhesive material easier to release from the applicator.

Figure 3A:
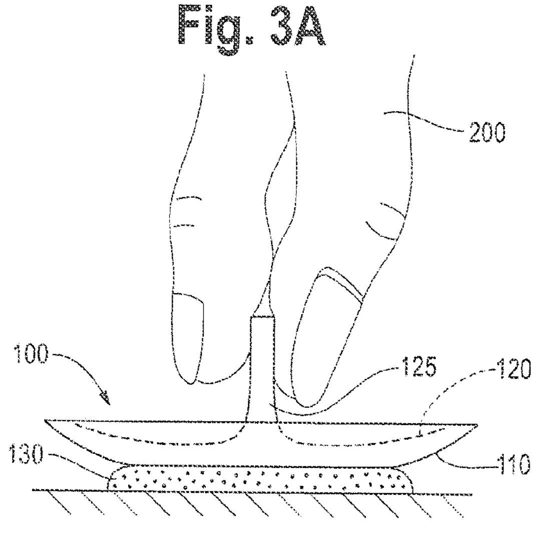
FIGS. 3A and 3B are cross-sectional views of an applicator delivering self-adhesive material in accordance with the invention.

Cross-sectional views of an applicator 100 delivering self-adhesive material 130 to a surface are as shown in FIGS. 3A and 3-B. As described above, the void 114 has a general concave shape. In one embodiment, the concave shape can be in the form of a deformable resilient shape of a dome and sidewalls. Such a shape easily deforms when force is applied and then recovers to its original profile when the force is removed. Material useful in the making such a deformable applicator 100 include deformable resilient material, such as flexible or rigid plastic including, but not limited to, thermoformed plastic.

Figure 3B:
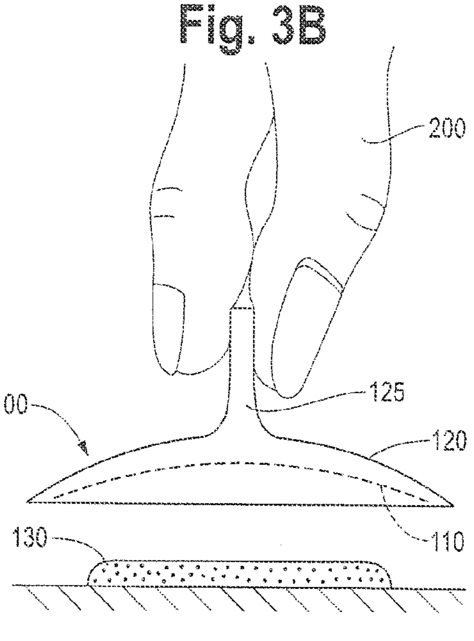

To use the applicator for the delivery of self-adhesive material 130 to a surface, the cover 140 is removed to expose the self-adhesive material. As shown in FIG. 3A the exposed self-adhesive material is positioned against a substrate. Appropriate pressure is applied to facilitate any required deformation of the applicator surfaces and the adhesion of self-adhesive material 130 to the substrate. When an optional handle 125 is available it can be grasped between a finger and thumb to help steady the applicator as it is being pressed against the substrate. As the applicator 100 is pressed against the substrate, the surfaces that define the normally concave void 114 deform so as to allow contact of the self-adhesive material with the substrate or surface. Because the adhesive force to the substrate or surface is greater than the adhesive force to surface portion 116, the self-adhesive material is released from the applicator 100. The surface portion 116 is optimally designed to facilitate release of self-adhesive material 130. The surface portion 116 can be designed and formed based on adhesive properties of the self-adhesive material so that less force is demanded to separate the self-adhesive material 130 from the surface portion 116 than to separate the self-adhesive material 130 from the substrate. Optimally, when the self-adhesive material 130 is brought into simultaneous contact with both the surface portion 116 and a substrate surface, and force is applied to remove the applicator 100 from the substrate surface, the self-adhesive material 130 is released from the surface portion 116, as illustrated in FIG. 3B. In some embodiments, upon release of self-adhesive material 130, the applicator 100 resumes its original profile with inner surface 110 forming a void 114 having a generally concave shape. Self-adhesive material 130 remains in contact with the substrate and is left behind on the substrate when applicator 100 is pulled away. The self-adhesive material 130 is held in place on the substrate by its adhesive properties.

Figure 4:
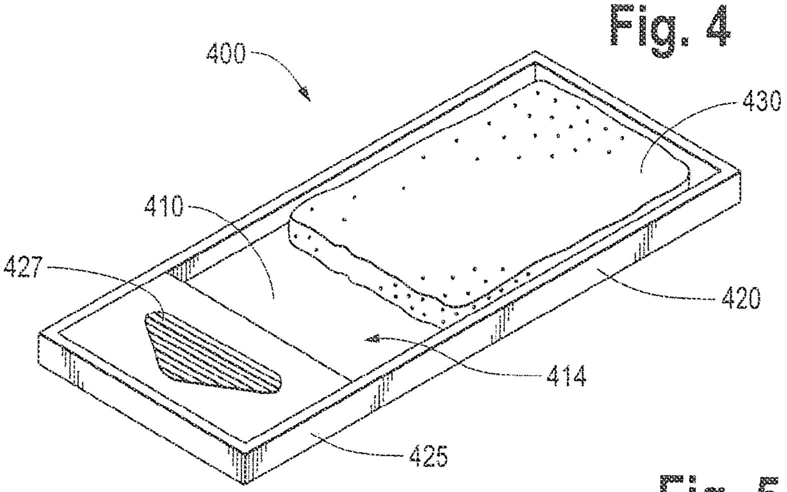
FIG. 4 is an illustration of an embodiment of an applicator for delivering a self-adhesive material to a substrate in accordance with the invention.

An embodiment of an applicator 400 for delivering a self-adhesive material to a substrate is as shown in FIG. 4. The applicator 400 has an inner surface 410 that defines a void 414 for holding a self-adhesive material 430. The applicator includes an outer surface 420 which along with the void can be individually formed to facilitate the handling and delivery of the self-adhesive material. The applicator can be formed from either a single material or various different materials. For example, the outer surface can be made of a rigid material this is formed to facilitate the holding, moving, manipulating, and so forth of the applicator while the inner surface can be made of material designed for the holding and delivery of the self-adhesive material. In some embodiments a portion of the applicator extends essentially laterally from the outer surface 420 so as to for a handle 425 which can be adapted to be grasped between a finger and thumb. In one embodiment, the handle 425 can include texturing 427 on either side to facilitate grasping the applicator. Optionally, the outer surface 420 of the applicator can be formed to accommodate the optional handle 425. The handle 425 facilitates maneuvering of the applicator into position for delivery of the self-adhesive material 430 to the surface. Such a handle can be useful for the attaching self-adhesive material to the inside surface of a toilet or generally and container that holds. As shown in FIG. 4, the outer surface 420, the inner surface 410, and the handle 425 are formed together as a single unitary device.

The inner surface 410 has a portion (not shown) that is adapted to receive and adhere a self-adhesive material 430. Self-adhesive material 430 can be a paste, gel or the like that is adapted for applying directly to a substrate. In some embodiments, the self-adhesive material 430 may be a sanitary agent that may be used to clean, disinfect or odorize a substrate. The self-adhesive material 430 can sanitize the substrate by disintegrating and releasing cleaning, disinfecting and/or deodorizing substances when contacted with a rinse liquid. In one embodiment the adhesive properties of the self-adhesive material 430 are controlled such that adhesive force of the self-adhesive material 430 to a surface portion (not shown) is less than adhesive force of the self-adhesive material 430 to a substrate. In this way, surface portion (not shown) readily releases the self-adhesive material when self-adhesive material 430 comes in contact with a surface or a substrate such as the inside surface of a toilet bowel.

Generally, the inner surface 410 defines a void 414 for accepting the self-adhesive material 430 which adheres to a portion (not shown) of the inner surface. The void formed by inner surface has a generally concave shape so the self-adhesive material 430 fits within the void. In some embodiments as shown in FIG. 5A, a cover 540 attaches to a periphery surrounding the void and seals the self-adhesive material within the void.

Use of the applicator 400 typically involves grasping the applicator 400 by the handle 425 between a finger and thumb. Any cover over the void is removed so as to expose the self-adhesive material 430 within the void 410 for delivery to a substrate. To position the applicator for delivery of the exposed self-adhesive material 430, a finger and thumb grasp handle 425 and maneuver the applicator 400 into contact with a substrate. Applicator 400 is positioned so that the self-adhesive material 430 can be brought into contact with the substrate. Optionally, while grasping the handle 425 of the applicator with a thumb and finger, a free finger on either hand can press on the outer surface 420 opposite the self-adhesive material to deform the applicator as required so that the self-adhesive material comes in contact with the substrate. For example, the applicator can be used to deliver a single dose of the self-adhesive material to a surface of a toilet by placing the applicator 400 with self-adhesive material 430 in contact with the surface of the toilet above a water line.

Figure 5A:
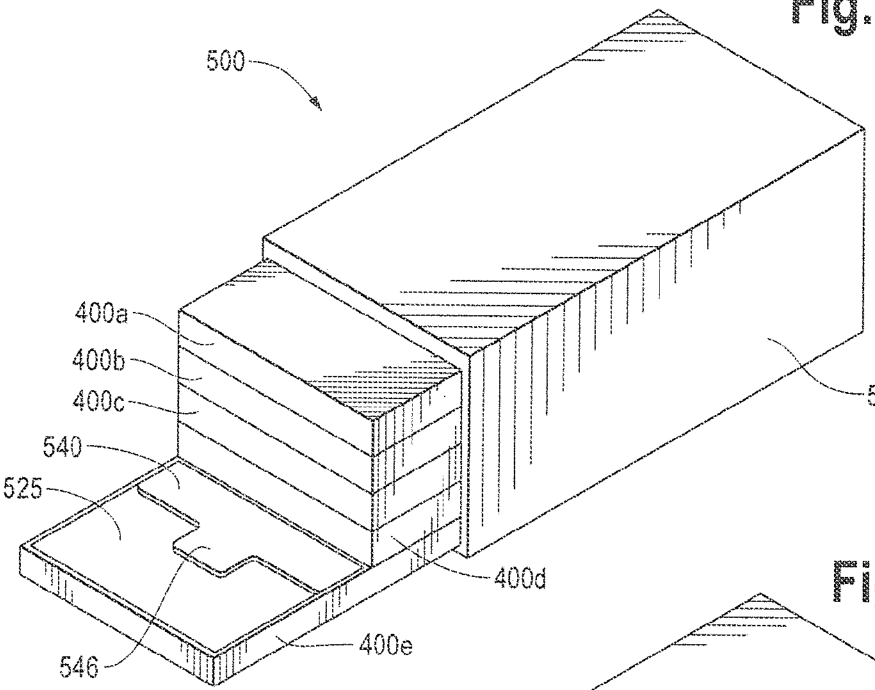
FIGS. 5A and 5B are illustrations of product packaging for use in providing self-adhesive materials that are delivered to a substrate in accordance with the invention.
Figure 5B:
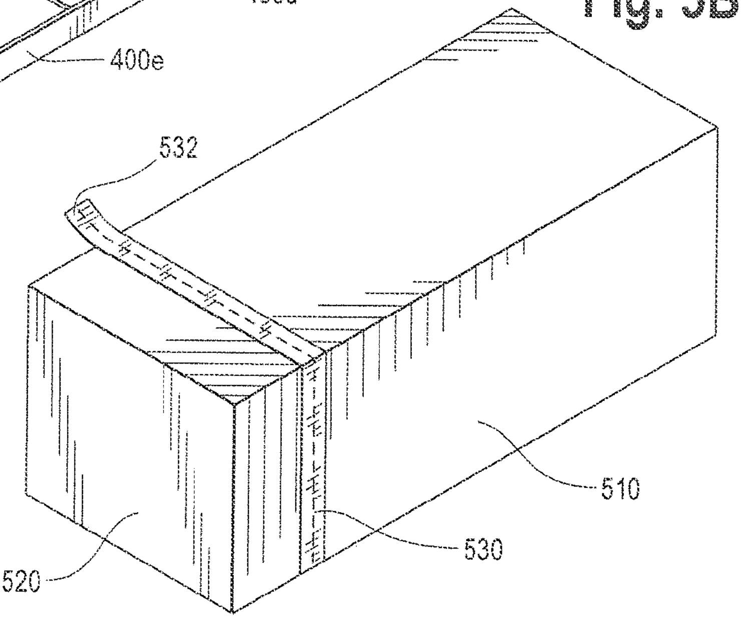

An example of product packaging for use in providing self-adhesive materials that are delivered to a substrate is as shown in FIGS. 5A and 5B. A plurality of applicators 400*a-e* for delivering a self-adhesive material can be combined in a single package as desired to meet marketing and customer need for convenience and cost. For example, product package 500 that holds multiple applicator in a fashion similar to a pack of chewing gum. Once opened the residual portion of the product package forms a container 510 that holds any remaining applicators while allowing for the easy removal of individual applicators. As generally known for typical consumer products, an end 520 of the product package is designed for easy and convenient removal so as to expose the plurality of applicators 400*a-e*. Again as commonly known in the art the products package 500 can include a perforated portion 530 and underlying pull tab 532 which can be used to "open" the product package by facilitating the removal of end 520. Once the end 530 is removed individual applicators can slide out of the product package 500 as is being exhibited by applicator 400*e*.

As shown in FIG. 5A, the applicator 400*e* can include a handle 525. Besides being useful during application of the self-adhesive material to a substrate as described above, such a handle can be used to facilitate the removal of an applicator such as 400*e* from the container 510. By grasping and pulling on the handle 525, the applicator 400*e* can be withdrawn from the container 510. Optionally, the applicators, such as 400*e*, can include a cover 540 that can used to protect the contained self-adhesive material. The cover can be formed to have a tab 546 which is to be used to help remove the cover 540. In another embodiment, the outer surface of the adjacent applicator can function as a cover.

Figure 6:
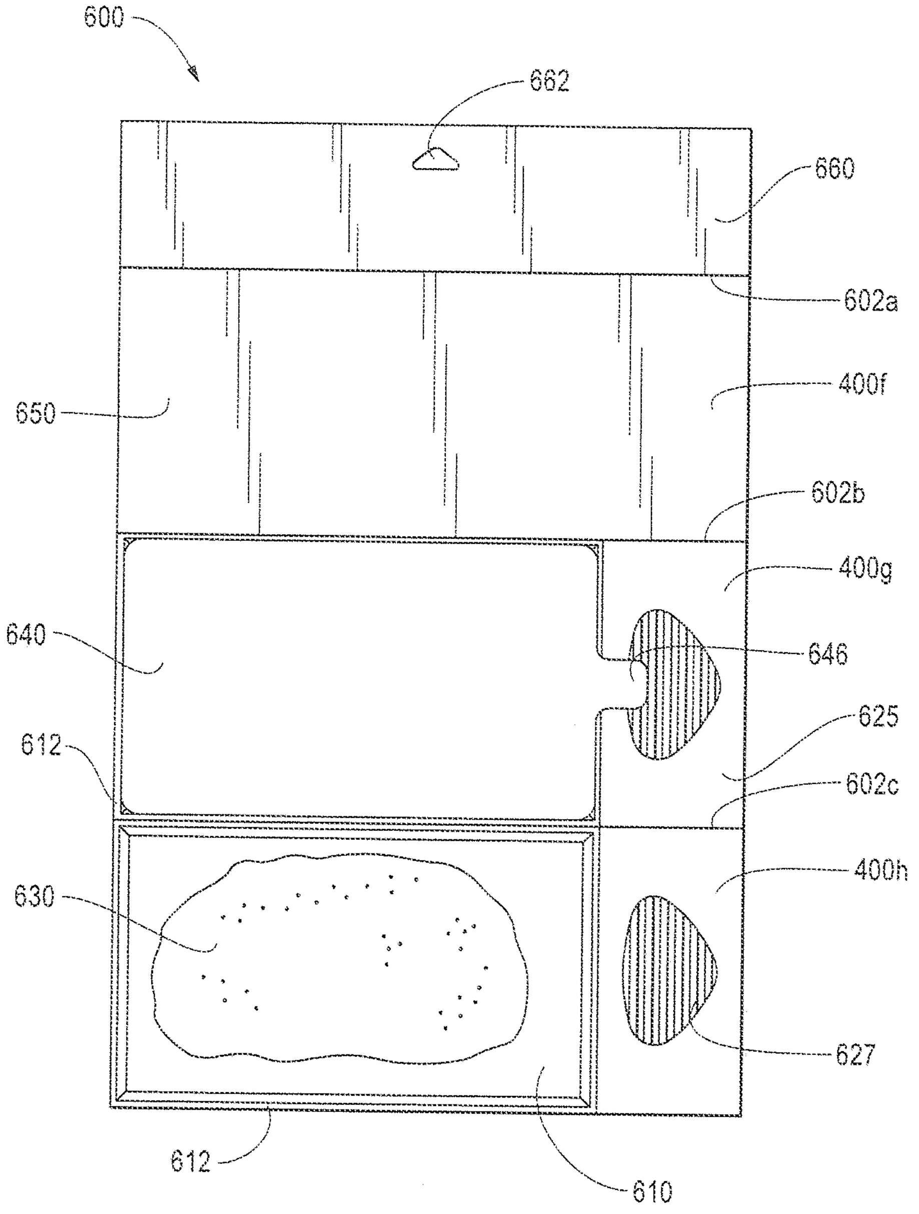
FIG. 6 illustrates hangable product packaging for use in providing self-adhesive materials that are delivered to a substrate in accordance with the invention.

In yet another embodiment of applicator packaging, hangable product packaging 600 for use in providing self-adhesive materials that are delivered to a substrate is as shown in FIG. 6. In this embodiment, a plurality of applicators 400*f-h* for delivering a self-adhesive material can be combined in a single package as desired to meet marketing and customer need for convenience and cost. In this embodiment, hangable product packaging 600 is designed to contain multiple applicators that are removably attached to one another in series. This type of hangable product packaging can include a tab 660 having aperture 662 for use in supporting hangable product packaging 600 form a marketing display or storage support such as by a peg, rod, nail, and so forth. As generally known for typical consumer products, the tab 600 and the applicators 400*f-g* are attached sequentially in series via separable connections 602*a-c*. For example, the connections can include a series of perforations or serrations, which allow each applicator to be serially removed from the hangable product packaging.

For illustration purposes the details of each of the applicators 400*f-h* are shown each individually and each with distinct view of the applicator. In actual use, the hangable product packaging would provide all the applicators in a closed and sealed form as common known for consumer products. In any case, each applicator includes a self-adhesive material 630 which is contained in a void 610. A cover 640 that attached to rim 612 can cover and protect the self-adhesive material in the void 610 and can have a tab 646. The applicator can include a handle 625 with optional gripping 627 that among other functions can be useful during the separation of an applicator from the hangable product packaging 600. Further and as commonly known in the supply of products, the hangable product packaging 600 can include optional protective layer 650 that surrounds and protects either individual or multiple applicators.

A non-limiting example of material used to form the various embodiments of the product packaging can includes biodegradable or other environmentally compatible materials include water-soluble materials as described above for use with the applicator. Optionally, the product packaging materials can be transparent, translucent, or opaque and can be constructed from single-layer sheets or multi-layer laminate sheets as deemed desirable based on a variety of considerations related to product supply, packaging, marketing, business needs, and so forth.

Figure 7:
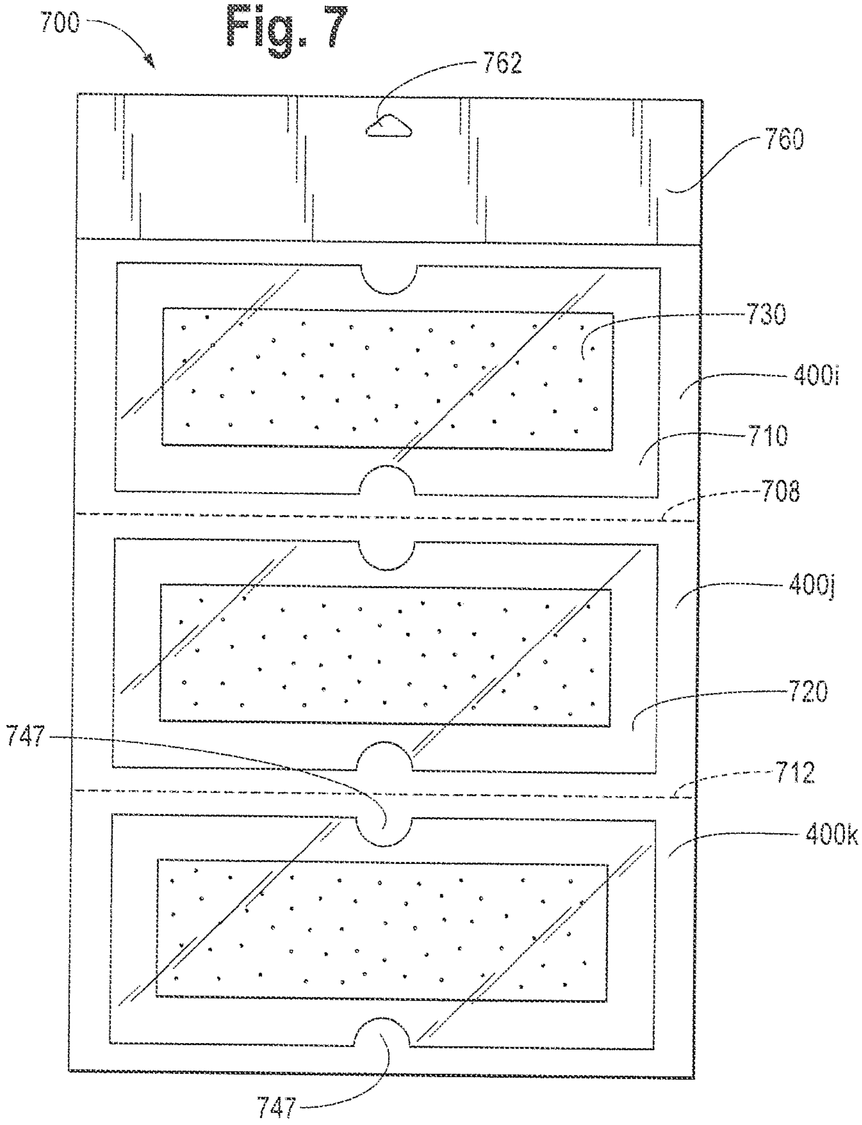
FIG. 7 depicts another exemplary embodiment of a hangable product packaging for use in providing self-adhesive materials that are delivered to a substrate in accordance with the invention.

FIG. 7 provides an exemplary alternative to the embodiment shown in FIG. 6. In this example, the applicator packaging may be provided in a hangable product packaging 600 for use in providing self-adhesive materials that are delivered to a substrate. In this embodiment, a plurality of applicators 400*i-k* for delivering a self-adhesive material 730 can be combined in a single package as desired to meet marketing and customer need for convenience and cost. In this embodiment, hangable product packaging 700 is designed to contain multiple applicators that are removably attached to one another in series. For example, in the embodiment shown in FIG. 7, the individual applicators may be separated by perforations 708 between the applicators. This type of hangable product packaging can include a tab 760 having aperture 762 for use in supporting hangable product packaging 700 form a marketing display or storage support such as by a peg, rod, nail, and so forth.

Figure 8:
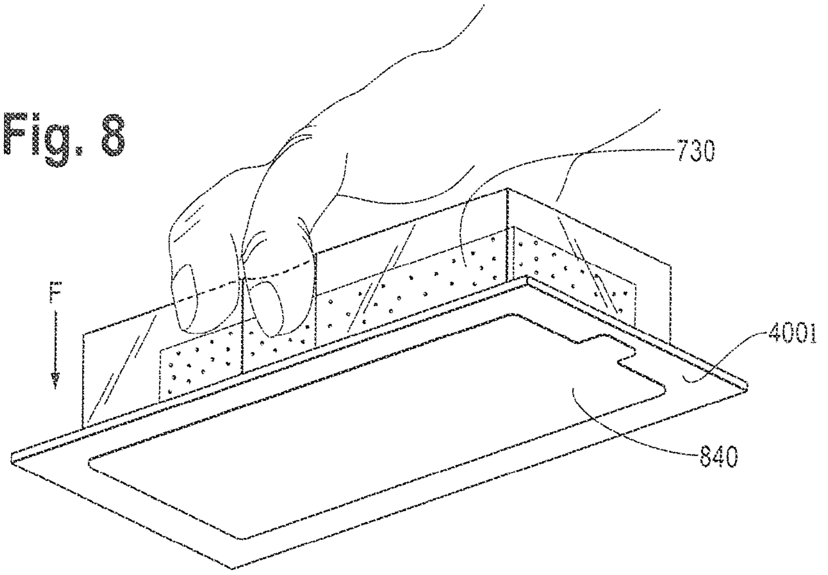
FIG. 8 depicts a process of using the hangable product packaging shown in FIG. 7.

For illustration purposes the details of each of the applicators 400*i-k* are shown each individually and each with distinct view of the applicator. In actual use, the hangable product packaging would provide all the applicators in a closed and sealed form as common known for consumer products. In any case, each applicator includes a self-adhesive material 730 which is contained in a void 710. A cover 740 that attached to rim 712 can cover and protect the self-adhesive material in the void 710 and can have one or more gripping areas 747 along the edge of the cover 740. In the embodiment shown in FIG. 7, the gripping areas 747 may be recesses that may accommodate the finger of a user. A surprising benefit of providing such gripping areas 747 is that the user may be able to place her finger(s) into the gripping areas 747, such as a thumb and middle finger and secure the adhesive material 730 and then use her index finger to engage the outer surface 720 and apply force, F, to effectively "press" the adhesive material 730 onto whichever surface she desires. Such a process is shown in FIG. 8 with the addition that an applicator 4001 is provided with a removable material 840 on the underside of the applicator 4001 that may be removed prior to engaging the material onto a surface (not shown). The removable material may be a foil that is adhered onto the underside of the applicator 4001 that secures the adhesive material 730 within the void of the applicator 4001 during storage, transport, etc.

Figure 9A:
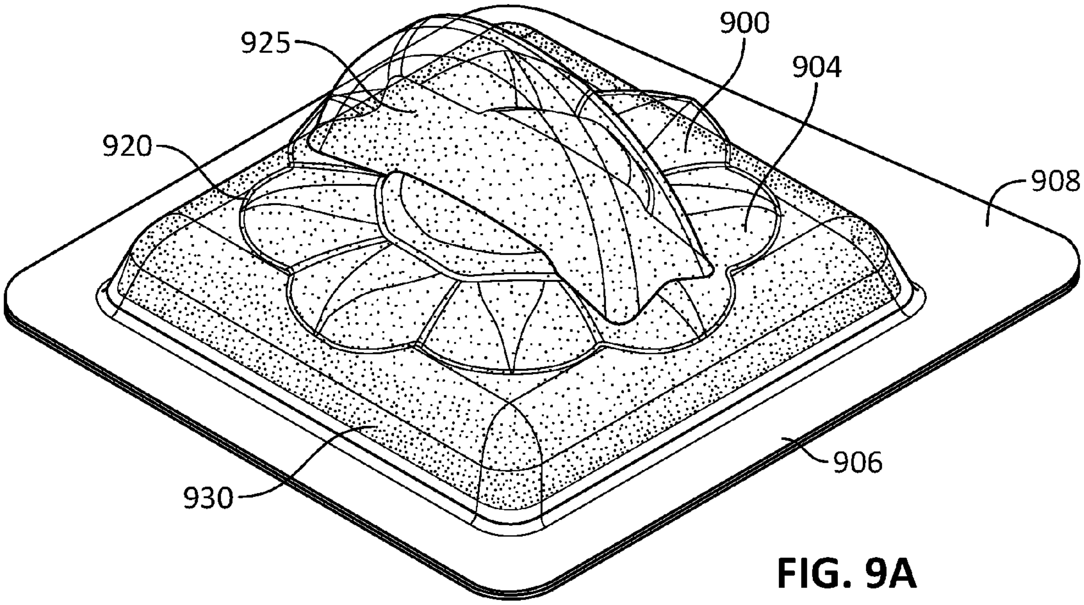
FIG. 9A depicts an isometric view of an another embodiment of an applicator for delivering a self-adhesive material.
Figure 9B:
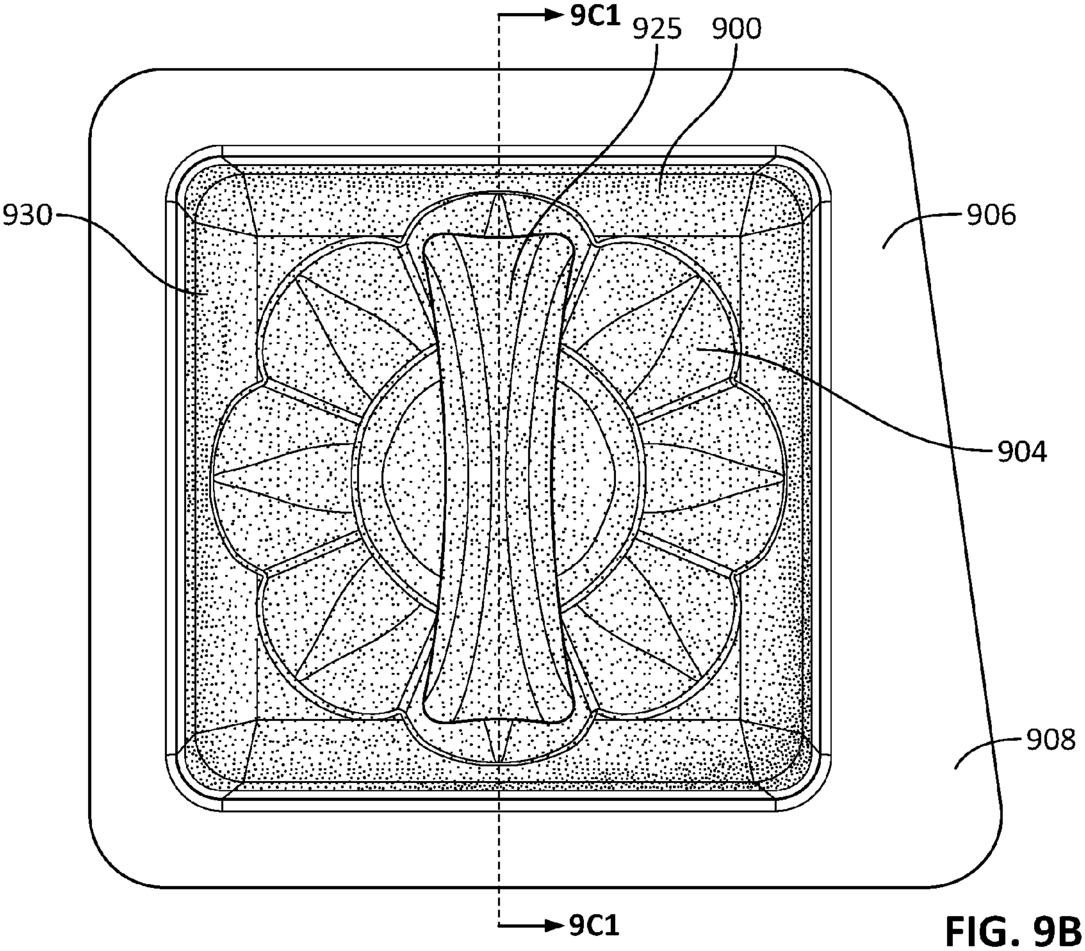
FIG. 9B depicts a top view of the applicator of FIG. 9A.
Figure 9D:
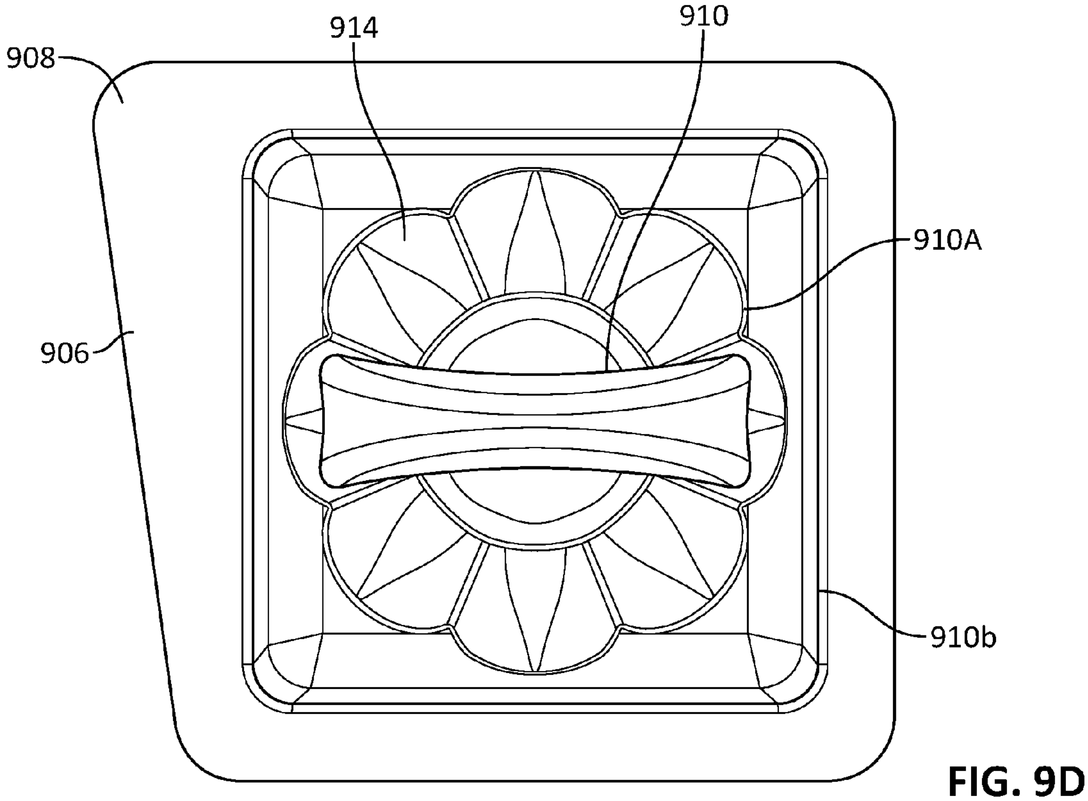
FIG. 9D depicts a bottom view of the applicator of FIG. 9A.
Figure 9E:
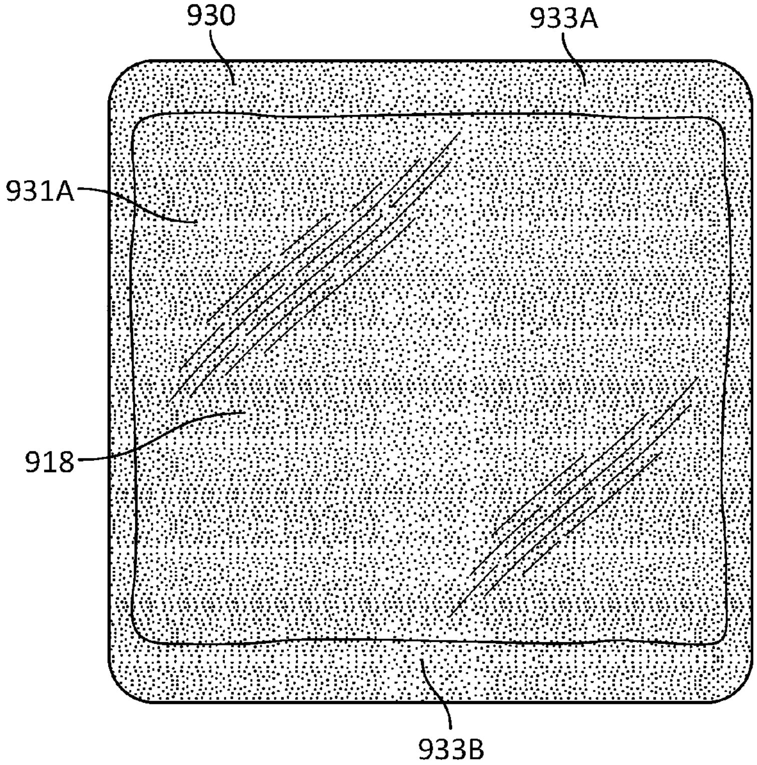
FIG. 9E depicts a top view of an exemplary self-adhesive material.

Another exemplary applicator 900 is depicted in FIGS. 9A-9E. Like reference numerals from the embodiments shown in FIGS. 1A-3B will be used to describe the applicator 900. It is understood that this embodiment can incorporate some or all of the aspects from any of the other embodiments disclosed herein. As depicted in FIGS. 9A and 9B, which are perspective and top views respectively, the applicator 900 includes an outer surface 920 that contains a handle 925 that can be grasped between the user's thumb and forefinger for applying a self-adhesive material 930 to a surface desired to be cleaned. FIG. 9C1 shows a cross-sectional view of the applicator 900 with self-adhesive material 930 located in the applicator 900. FIG. 9C2 shows an enlarged section of FIG. 9C1. FIG. 9D shows a bottom view of the applicator 900 without the self-adhesive material 930 located in the applicator 900 and cover 940 removed. FIG. 9E shows a top view of an exemplary adhesive material 930, which can be applied to a surface desired to be cleaned by the applicator 900.

The outer surface 920 of the applicator 900 can be formed with an ornamental design or shape 904 to make the product more appealing to the consumer. The design or shape 904 can be any type of ornamental feature and can also include a company name, logo, etc. The design 904 can be shaped into a self-adhesive material 930 by the applicator 900 when the self-adhesive material 930 is applied to a surface to be cleaned as discussed herein. In particular, when a force is applied to the outer surface 920 of the applicator 900, the self-adhesive material 930 is formed such that it can be formed into the shape of the applicator 900 when the user applies a force to the applicator 900.

In one embodiment, the applicator 900 is transparent; however, the applicator 900 can be formed translucent, opaque, or a solid color. The applicator 900 can be formed of polyethylene terephthalate (PET) and other materials described herein. Additionally, other suitable materials are contemplated for forming the applicator 900 such that the applicator 900 flexes once a force is applied to the applicator 900 to assist in releasing the self-adhesive material 930. The PET material can be thermoformed into the desired shape of the applicator 900.

As shown in FIGS. 9A-D, the applicator 900 can be formed with a flange 906. The flange 906 provides a surface for attaching cover 940. The cover 940 can be formed of a foil material and the other materials described herein. Additionally, other suitable materials for containing the self-adhesive material 930 within the applicator 900 are contemplated. The flange 906 can extend around the perimeter of the periphery of the applicator 900 and provides a bottom surface for receiving the cover 940. The flange 906 can extend continuously, as shown, or intermittently around the perimeter of the applicator 900. The self-adhesive material 930 can be placed into the applicator 900, and the cover 940 can be heat sealed onto the applicator 900. Alternatively, the cover 940 can be secured to the flange 906 using a suitable adhesive. The flange 906 can also be formed with at least one enlarged or outwardly projecting region, shown as an angled portion 908. The angled portion 908 defines a location for the user to remove the cover 940 to expose the self-adhesive material 930 to a surface desired to be cleaned and can provide a region along the flange 906 that eases removal of the cover 940. In addition, although not shown, a degree of separation can be provided between the angled portion 908 and the cover 940 to provide the user with a grasping portion to remove the cover 940.

The applicator 900 includes an inner surface 910 having an inner recess or void 914 for receiving the self-adhesive material 930. As shown in FIGS. 9C1, 9C2, and 9D, the inner surface 910 and inner recess 914 are defined by upper regions 910A and angled side regions 910B. As shown in FIG. 9D, the inner surface 910 can include a correspondingly shaped design as the outer surface 920. In another exemplary embodiment, the inner surface 910 can include a shaped design that is different than the shape of the outer surface 920. The design 904 can be wholly or partially imprinted onto the adhesive material 930 when the user applies a downward force to the applicator 900 sufficient to apply the self-adhesive material 930 to a surface desired to be cleaned. In other words, the inner surface 910 of the applicator 900 can define a contour that is initially offset from the self-adhesive material 931 and the upper region 910A can be configured to at least partially imprint the contour onto the self-adhesive material 931 when the self-adhesive material 930 is applied to the surface desired to be cleaned.

The self-adhesive material 930 can be a toilet bowl freshening and cleaning product. The self-adhesive material 930 can be formed of a gel of the materials described herein. However, other suitable materials are also contemplated. The self-adhesive material 930 can have a paste, dough or putty-like consistency, which can be formed into the shape of the inner surface 910 of the applicator 900. The self-adhesive material 930 can be designed or selected based on force parameters as defined herein.

As shown in FIGS. 9C1 and 9C2, an air gap 912 can be formed within the inner recess 914 between the inner surface 910 and the self-adhesive material 930 when the self-adhesive material 930 is placed into the applicator 900. In particular, the upper region 910A of the inner surface 910 and a first surface 931A of the self-adhesive material 930 forms an air gap or pocket 912 between the self-adhesive material 930 and the inner surface 910 of the applicator 900.

In addition, as shown in FIGS. 9C1 and 9C2, side air gaps 913 can be formed between the self-adhesive material 930 side portions 932 and the applicator 900 angled side portions 932 around the periphery of the self-adhesive material 930. The side air gaps 913 can provide an easier and cleaner removal of the self-adhesive material 930 from the applicator 900 during use.

The upper region 910A of the inner surface 910 can also define the ornamental design 904 for molding the self-adhesive material 930. When the self-adhesive material 930 is applied to a surface to be cleaned, the force from the user pressing the self-adhesive material 930 onto the surface, can form the shape of the inner surface 910 of the applicator 900 onto the self-adhesive material 930. When the user presses the self-adhesive material 930 into the inner surface 910 of the applicator 900, the self-adhesive material 930 flows into the shape of the inner surface 910. Thus, the shape of the inner surface 910 and design 904 defined by the upper region 910A is formed or molded onto the first surface 931A of the self-adhesive material 930. Configuring the applicator 900 such that the user molds the design 904 of the applicator 900 into the self-adhesive material 930, also may provide the user with a tactile feedback in sensing how much force should be applied to the applicator 900 for the self-adhesive material 930 to properly adhere and remain attached to the surface to be cleaned.

Additionally, the gap 912 between the inner surface 910 of the applicator 900 and the self-adhesive material 930 can help achieve the desired adhesive force between the application surface and the self-adhesive material 930 prior to placement of the adhesive material 930 onto the surface to be cleaned. The gap 912 can also assist the user by giving a tactile feedback in dispensing the self-adhesive material 930 onto a surface. In detail, when the user applies a downward force onto the applicator 900, the user can sense that the applicator 900 is engaging the first surface 931A of the self-adhesive material 930. This may help assist the user in providing the requisite force on the applicator 900 and the self-adhesive material 930 so that enough force is applied to the self-adhesive material 930. This may help ensure that the self-adhesive material 930 comes off of the applicator 900 and remains on the surface to be cleaned during the intended use cycle of the product.

FIG. 9E shows the self-adhesive material 900 removed from the applicator 900 prior to applying the self-adhesive material 930 to a surface. The self-adhesive material 930 can be formed in a flat square shape. Additionally, the first surface 931A can be formed flat for being shaped by the inner surface 910 of the applicator 900.

Also as shown in FIG. 9E, a release layer 918 can be included on the self-adhesive material 930. The release layer 918 can be formed to only partially cover the self-adhesive material 930 to provide for only selected regions of the first surface 931A of the self-adhesive material 930 to adhere to the applicator 900. For example, as shown in FIG. 9E, the release layer 918 can be formed such that it covers a majority of the entire first surface 931A of the self-adhesive material 930 except for thin strips 933A, 933B of the first surface 931A along opposite edges. Exposing these thin strips 933A, 933B on the first surface 931A of the self-adhesive material 930 to the applicator 900 can provide for the desired adhesive force between the applicator 900 and the self-adhesive material 930 for ensuring that the self-adhesive material 930 releases properly from the applicator 900.

Using the arrangement, the thin strips 933A, 933B of the self-adhesive material 930 can provide an adequate adhesive force on the applicator 900 such that the self-adhesive material 930 does not become dislodged from the applicator 900 before being placed into contact with the application surface. Additionally, the release layer 918 can be provided with a certain adhesive force and together the adhesive forces of the release layer 918 and the self-adhesive material 930 can provide for the desired adhesive forces between the first surface 931A of the self-adhesive material 930 and the applicator 900. Additionally, the release layer 918 can be provided with holes or notches (not shown), in lieu of or in addition to the thin strips 933A, 933B, to provide for the requisite adhesive force between the applicator 900 and the adhesive material 930. Such holes or notches would allow for additional regions on the first surface 931A of direct contact between the self-adhesive material 930 and the applicator 900.

The release layer 918 can be formed of a clear polyvinyl alcohol (PVA) film and the other materials described herein with respect to other embodiments. However, other suitable materials are also contemplated. For example, the release layer can be formed of a paper substrate, that is transparent and breaks up in water rapidly, a powder-like talc, or corn starch that inhibits the self-adhesive material 930 from sticking to the applicator 900. The release layer 918 can be formed of any suitable material that limits the area of the self-adhesive material 930 to be less than the area of the second surface 931B of the self-adhesive material 930 that will be applied to desired cleaning surface. It is also contemplated that the applicator 900 can be designed such that the release layer 918 can be omitted.

The release layer 918 also prevents the self-adhesive material 930 from fracturing when the self-adhesive material 930 is removed from the applicator 900. The release layer 918 allows the self-adhesive material 930 to de-adhere from the applicator 900 rather than fracturing the self-adhesive material 930 when it is applied to a surface. This ensures that the self-adhesive material 930 is fully removed from the applicator 900 when applying the self-adhesive material 930 to the surface to be cleaned and that all of the self-adhesive material 930 is placed on the surface to be cleaned. This helps ensure that none of the self-adhesive material 930 is wasted.

Although not shown, the applicator can also be provided with undercuts on the inner surface to provide for retention of the self-adhesive material in the applicator during application of the self-adhesive material to the surface to be cleaned. The undercuts and the applicator can be formed such that during the application of the self-adhesive material to the surface to be cleaned, the undercuts move out of the way allowing the self-adhesive material to become detached and to be transferred to the surface to be cleaned.

Also a certain level of flexibility can be designed into the package such that during the application of the self-adhesive material to the surface to be cleaned, a tensile force is generated in the region where the self-adhesive material is secured to the applicator. This may facilitate the removal of the self-adhesive material from the applicator.

To form the applicator 900, as discussed above, the PET material can be thermoformed into the desired shape of the applicator 900. The self-adhesive material 930 can then be loaded into the applicator 900 recess 914. A limited force can be applied to the self-adhesive material 930 once loaded into the applicator 900 such that the air gap 912 is formed within the inner recess 914 between the inner surface 910 and the self-adhesive material 930. The size of the self-adhesive material 930 can be selected such that side air gaps 913 are formed between the self-adhesive material 930 side portions 910B and the applicator 900 angled side portions 932 around the periphery of the self-adhesive material 930. The cover 940 can then be heat sealed onto the applicator 900. Alternatively, the cover 940 can be secured to the flange 906 using a suitable adhesive. In further alternative methods, the adhesive material 930 can be placed onto the cover 940 and then loaded into the applicator 900 to form the air gap 912.

To use the product, the user peels off the cover 940 to expose the self-adhesive material 930 to a surface desired to be cleaned, such as the inner surface of a toilet above the water line and below the rim of the toilet. To peel the cover 940 from the applicator 900, the user can grab the cover 940 near the angled portion 908. The angled portion 908 can include a degree of separation between the cover 940 and the flange 906 to provide an easier grasping portion on the cover for the user to remove the cover 940 from the applicator 900.

Once the cover 904 is removed from the applicator 900, the user, then gripping the handle 925 can place the self-adhesive material 930 into contact with the surface desired to be cleaned by taking the opened side of the applicator 900 exposing the self-adhesive material 930 and pressing the self-adhesive material 930 onto the surface to be cleaned. The user can then press the inner surface 910 of the applicator 900 against the self-adhesive material 930 first surface 931A to apply the self-adhesive material 930 second surface 931B onto the surface of the toilet while imprinting the design 904 from the inner surface 910 of the applicator 900 onto the self-adhesive material 930. The applicator 900 can be configured to flex outwardly from the handle 925 once a force is applied to the applicator 900 and handle 925 to assist in releasing the self-adhesive material 930. The user then removes the self-adhesive material 930 from the applicator by pulling back on the handle 925 to apply a force substantially perpendicular to the second surface 931B. In this way, the self-adhesive material 930 readily comes out of the applicator 900 and remains stuck to the surface desired to be cleaned.

Figure 14B:
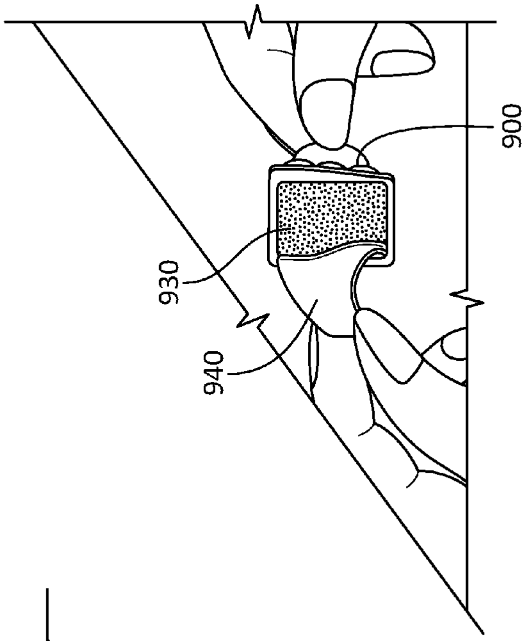
FIGS. 14A-F illustrate an exemplary method of using an applicator and self-adhesive material.
Figure 14A:
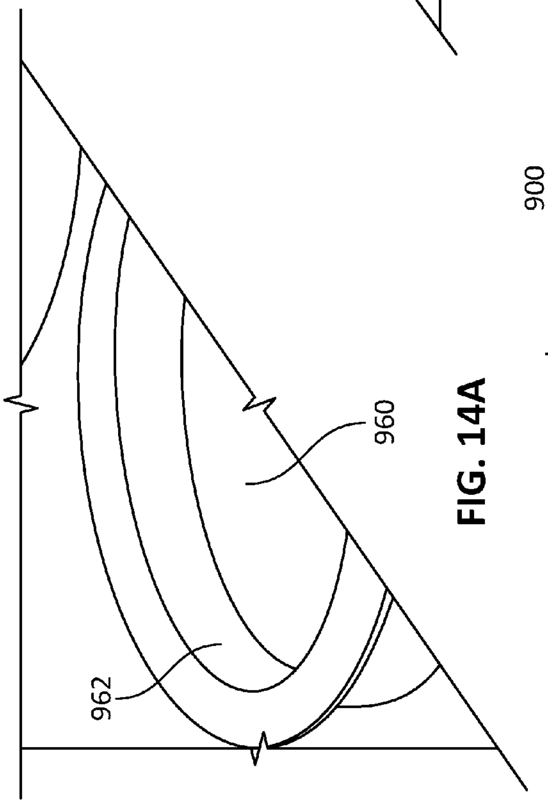
Figure 14C:
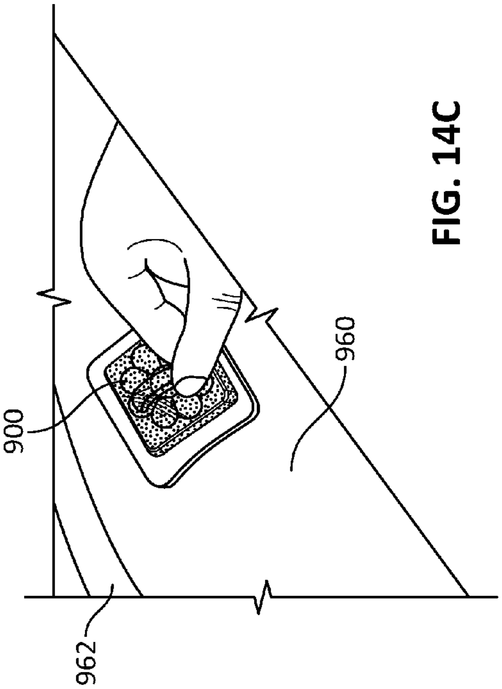

FIGS. 14A-14F illustrate an exemplary method of using the applicator 900 and self-adhesive material 930. In this example, the self-adhesive material 930 can be used to clean a toilet surface 960. First, the user may dry the desired surface 960 to be cleaned. However, it is also contemplated that the self-adhesive material 930 can be applied to a wet surface. As shown in FIG. 14B, the user then removes the cover 940 from the applicator 900 to expose the self-adhesive material 930. As shown in FIG. 14C, the user presses the applicator 900 and the self-adhesive material 930 firmly against the toilet surface 960 to secure the self-adhesive material to the surface 960.

Figure 14E:
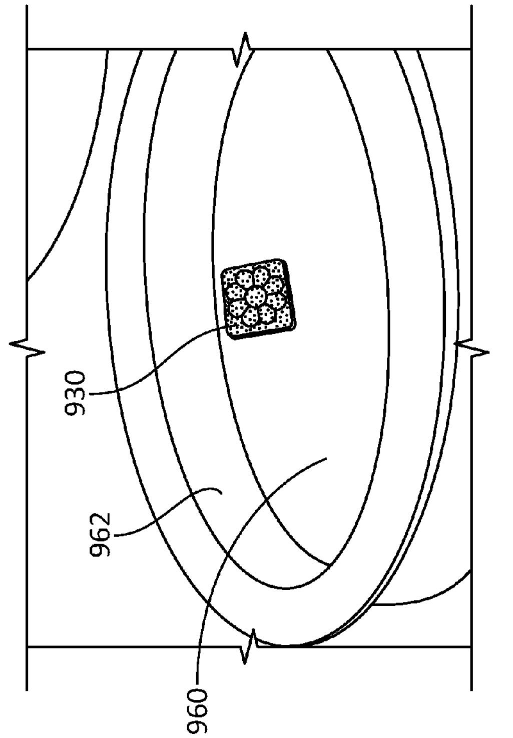
Figure 14D:
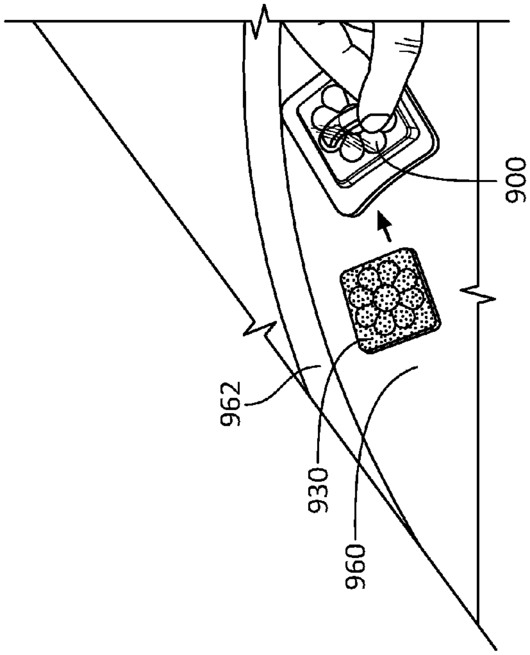

As shown in FIG. 14D, the applicator 900 is then pulled away from the toilet surface 900 to apply a force substantially perpendicular to the self-adhesive material, and the self-adhesive material 930 remains fixed to the surface 960. As shown in FIG. 14E, the user can place the self-adhesive material 930 slightly below the rim 962 of the toilet such that the water can come into contact with the self-adhesive material 930 when the toilet is flushed. The user can then flush the toilet to activate the cleaning components of the self-adhesive material 930.

Figure 14F:
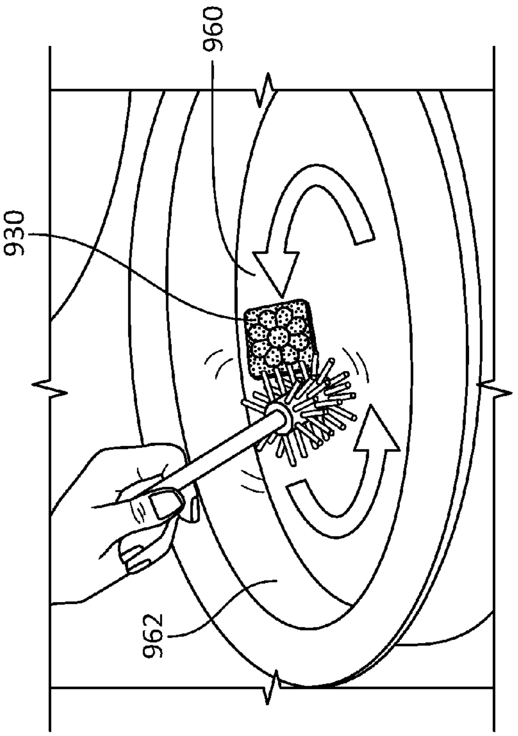

Installed in this manner, the self-adhesive material 930 can function as a continuous toilet bowl cleaner such that after each flush of the toilet water comes into contact with the material and the cleaning components are dispersed about the toilet surface 960. Thus, cleaning takes place without further efforts from the user. After a period of time (e.g., hours, days, weeks, etc.), during which a number of flushes have been made, a user can then use the remaining portion of the self-adhesive material 930 as a manual toilet bowl cleaner. For example, as shown in FIG. 14F, the user can brush the remaining portions of the self-adhesive material 930 to conduct a manual cleaning of the toilet surface 960. Although the applicator 900 and self-adhesive material 930 in this example are used to clean a toilet, other applications and uses of the applicator 900 and self-adhesive material 930 are contemplated.

The square-like shape of the applicator 900 can have both functional and ornamental features. For example, the square shape of the applicator 900 may provide for a more even distribution of forces when the applicator 900 is pressed against the desired cleaning surface to uniformly release the self-adhesive material 930 onto the desired cleaning surface. The rectangular structure of the applicator 900 can also provide a strong force feedback to the user when applying the self-adhesive material 930 to the desired cleaning surface such that the user knows how much force to apply to the desired cleaning surface to ensure that the self-adhesive material 930 is adequately secured to the surface desired to be cleaned.

Additionally, the correspondingly shaped self-adhesive material 930 can uniformly dissolve in a toilet during use. Furthermore, the square shape may help in providing the requisite ratio of weight of the self-adhesive material 930 to surface area of the self-adhesive material 930 for adhering the self-adhesive material 930 to the desired cleaning surface. The square shape of the applicator 900 can also be ornamental and ascetically pleasing to the user and entice a user to purchase the product based on the appearance of the applicator 900 and the self-adhesive material 930 within the applicator 930.

The transfer of the self-adhesive material 930 from the applicator 900 to the bowl requires a delicate balance of forces. A sufficient adhesion force is required to keep the self-adhesive material 930 inside the applicator 900 such that the self-adhesive material 930 does not fall out of the applicator prior to application of the self-adhesive material 930 to the surface desired to be cleaned. The adhesion force between the self-adhesive material 930 and the surface desired to be cleaned must be greater than the force required to retain the product inside the applicator 900 such that a clean transfer of the self-adhesive material 930 to the surface to be cleaned occurs. These forces are described and represented below and in the accompanying FIGS. 9E and 13.

The force required to fracture the self-adhesive material must be higher than the force required to transfer the self-adhesive material from the applicator 900 to the surface desired to be cleaned. Otherwise, the self-adhesive material will fall apart when being transferred the surface desired to be cleaned. The self-adhesive material 930 can be placed into a tensile testing device to determine the fracture force of the self-adhesive material 930 to determine whether the self-adhesive material 930 has the right amount of fracture force.

Figure 9F:
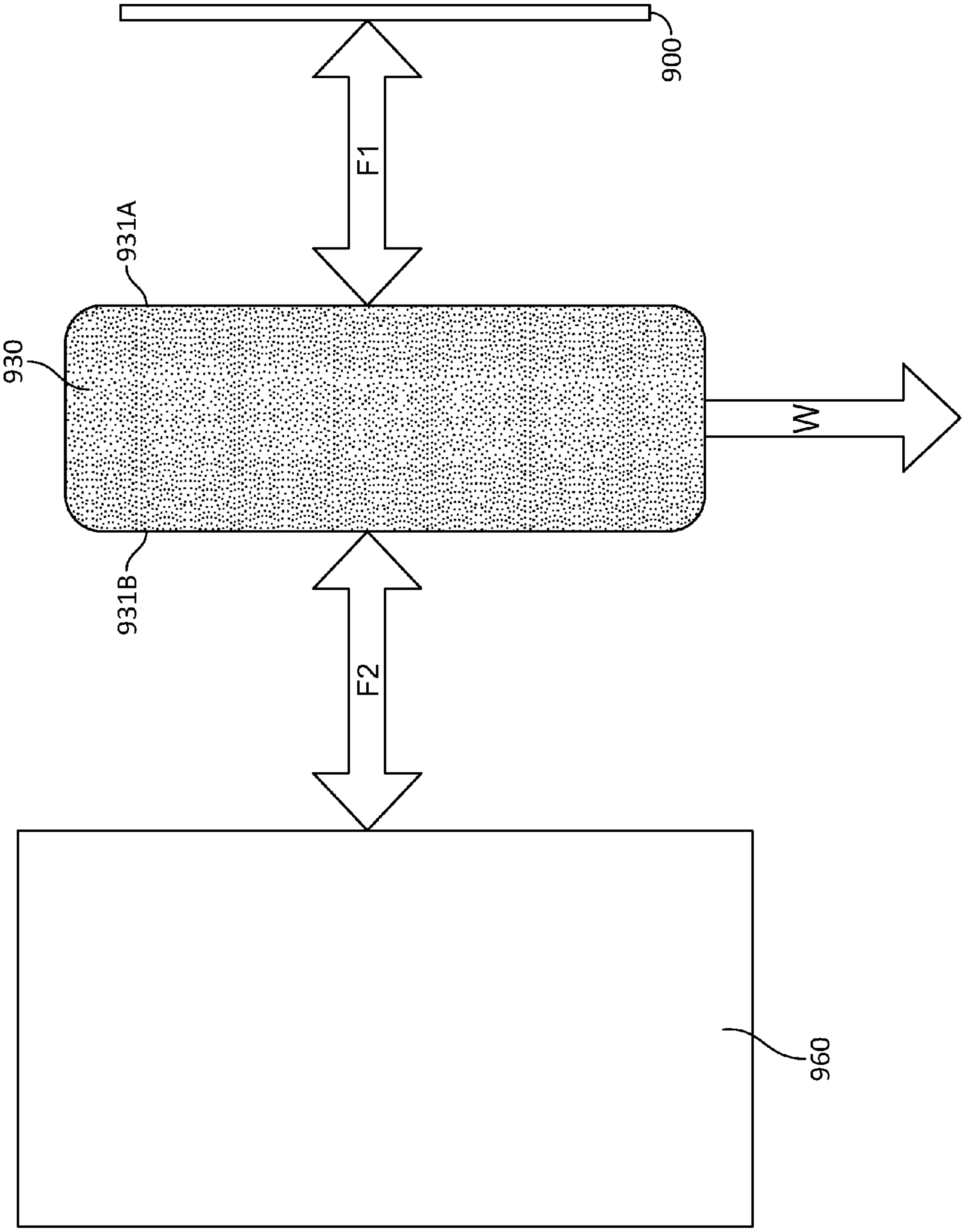
FIG. 9F depicts a schematic of the forces involved in transferring a self-adhesive material to a desired cleaning surface.

A schematic of the forces involved in transferring the self-adhesive material 930 to the desired cleaning surface 960 from the applicator 900 is depicted in FIG. 9F. The adhesion force F1 between the applicator 900 and the first surface 931A of the self-adhesive material 930 must be less than the adhesion force between the self-adhesive material 930 second surface 931B and the desired cleaning surface 960. In this way, the self-adhesive material 930 can properly transfer from the applicator 900 to the desired cleaning surface 960. Additionally, the adhesion force F1 between the applicator 900 and the first surface 931A of self-adhesive material 930 and the adhesion force F2 between the self-adhesive material 930 and the desired cleaning surface 960 must be greater than the weight W of the self-adhesive material 930.

The adhesion force F1 between the self-adhesive material 930 and the applicator 900, the adhesion force F2 between the self-adhesive material 930 and the surface desired to be cleaned, and the force required to fracture the self-adhesive material 930 can each be used to determine the total surface area required to retain the self-adhesive material 930 in the applicator 900. As the surface area of the self-adhesive material 930 increases, the adhesive forces F1 and F2 also increase.

The size of the release layer 918 can also be determined by calculating or measuring forces F1 and F2. For example, if the surface area of the second surface 931B of the self-adhesive material 930 is less than the surface area of the first surface 931A of the self-adhesive material 930, F1 is likely to be greater than F2. Therefore, by including the release layer 918 onto a portion of the first surface 931A of the self-adhesive material 930, the surface area of the first surface 931A of the self-adhesive material 930 is effectively reduced thereby reducing F1, the adhesion force between the self-adhesive material 930 and the applicator 900. By calculating F2 and the weight of the adhesive material 930, the area of the first surface 931A which is covered by the release layer 918, can be determined.

In one example, the force F1 required to retain the adhesive material in the applicator is 0.045 lbs. based on a 10 gm product weight and a safety factor of 2. The pressure to remove the gel from the applicator was measured at 4.1 psi. Based on this value, the required surface area of the first surface of the self-adhesive material to ensure that the self-adhesive material does not fall out of the applicator is 0.011 $in^2$. On this basis, the release layer can be sized to only leave 0.011 $in.^2$ of surface area on the first surface of the self-adhesive material exposed. This is also equivalent to having two openings sized to 0.085 in. in diameter in the release layer.

Continuing with this example, the force F2 required to pull the self-adhesive material from the desired surface to be cleaned is measured. When the self-adhesive material is applied to the desired surface to be cleaned, the adhesion force between the desired surface and the self-adhesive material is 1.5 lbs. This force is greater than the adhesion force of 0.045 lbs. and, therefore, the self-adhesive material will be transferred effectively from the applicator 900 to the desired surface to be cleaned.

Figure 13:
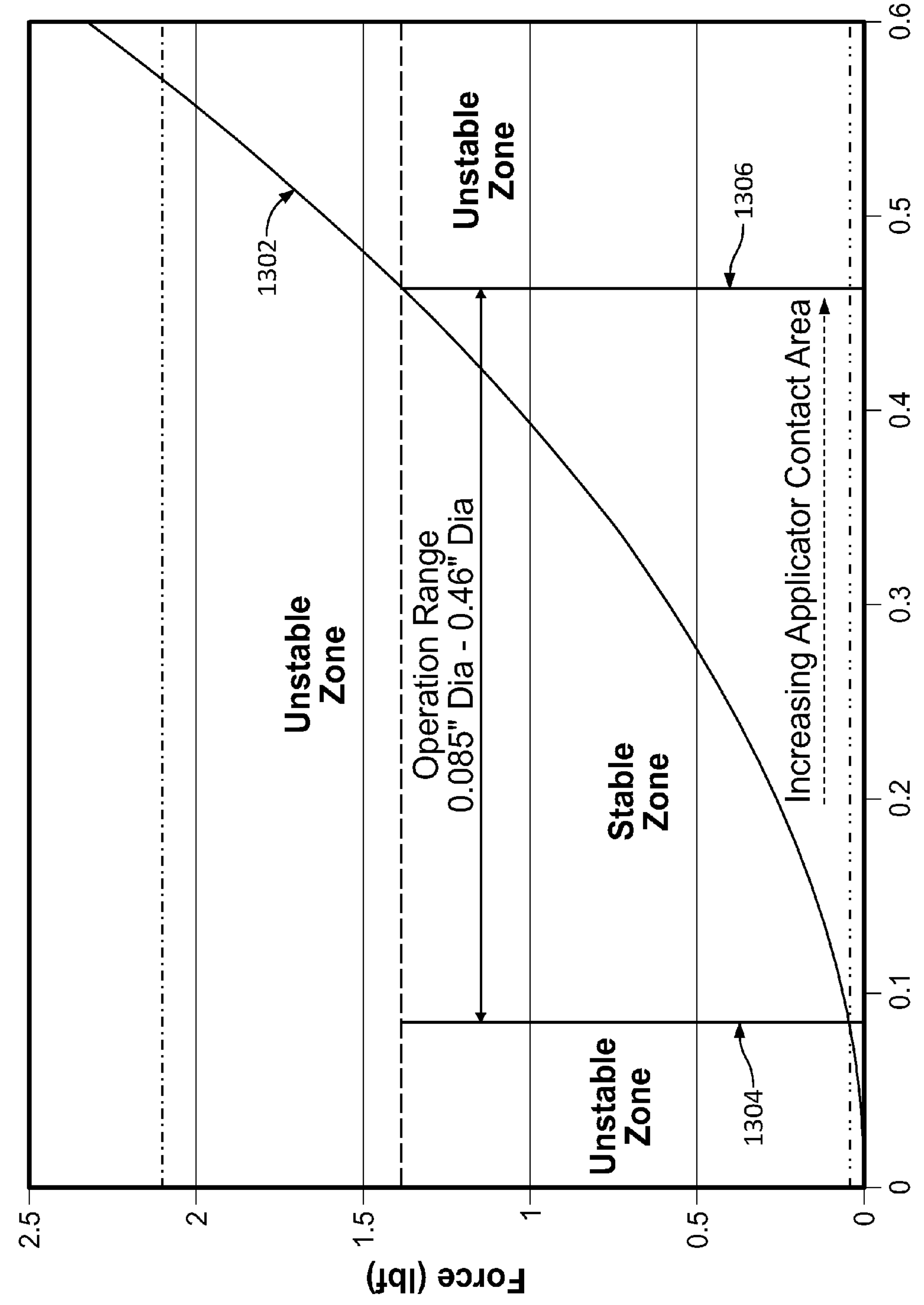
FIG. 13 shows an exemplary graph of force variations within a particular sample.

FIG. 13 shows an example of force variations with the surface area between the self-adhesive material and the applicator. The force F1 required to remove the self-adhesive material from the applicator is displayed on the Y-axis, and the contact surface area between the self-adhesive material and the applicator is displayed on the X-axis in $in.^2$. A curve 1302 represents F1, the force required to remove the self-adhesive material from the applicator. As shown by the graph as the contact area between the applicator and the adhesive material increase, the force F1 increases. A stable zone is represented between a minimum diameter boundary 1304 and a maximum diameter boundary 1306. The stable zone provides a range where the self-adhesive material will be effectively transferred from the applicator to the surface to be cleaned.

FIG. 13, however, is merely an example of a suitable operational range. The stable zone and operational range are subject to the particular design of the applicator and self-adhesive material. Thus, other force variations are contemplated to be within the scope of the invention.

Figure 10A:
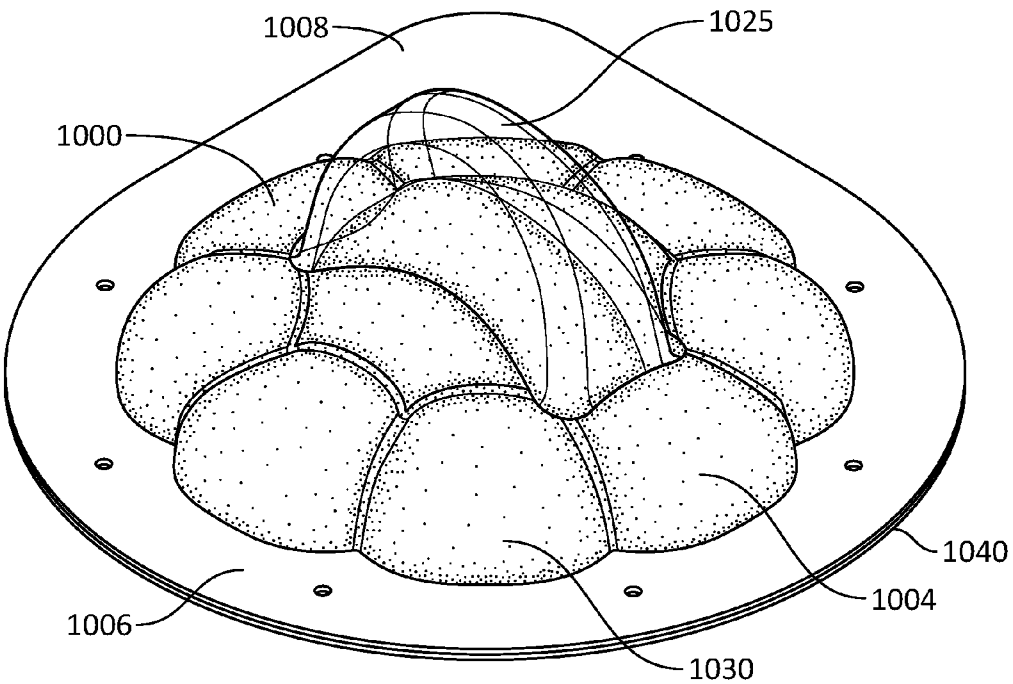
FIG. 10A depicts an isometric view of another exemplary applicator.
Figure 10B:
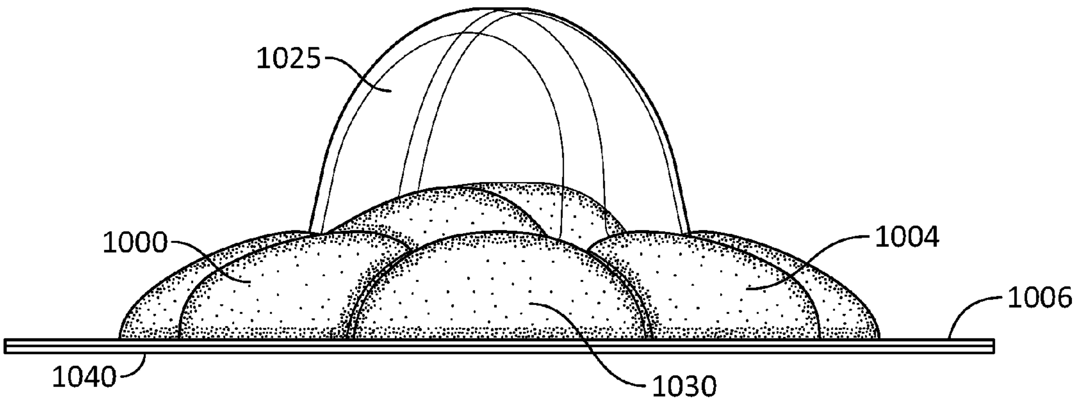
FIG. 10B depicts a side-view of the exemplary applicator of FIG. 10A.

Another exemplary embodiment is depicted in FIGS. 10A and 10B where like reference numerals represent like components. It is understood that this embodiment can incorporate some or all of the aspects from any of the other embodiments disclosed herein. In this embodiment, the applicator 1000 is formed in a circular dome-like shape. However, other shapes and configurations are contemplated. Like the embodiment shown in FIGS. 9A-9E, a self-adhesive material 1030 is held within the inside area of the applicator 1000 for dispensing by the user onto a cleaning surface desired to be cleaned. The applicator 1000 includes a handle 1025 and a flange 1006 for receiving a cover 1040. The flange can include an extension 1008, which permits the user to easily peel the cover 1040 from the applicator 1000 to apply the self-adhesive material 1030 to the surface to be cleaned. Additionally, the applicator 1000 can be provided with an ornamental design 1004 on the outer surface 1020 of the applicator 1000.

Figure 11A:
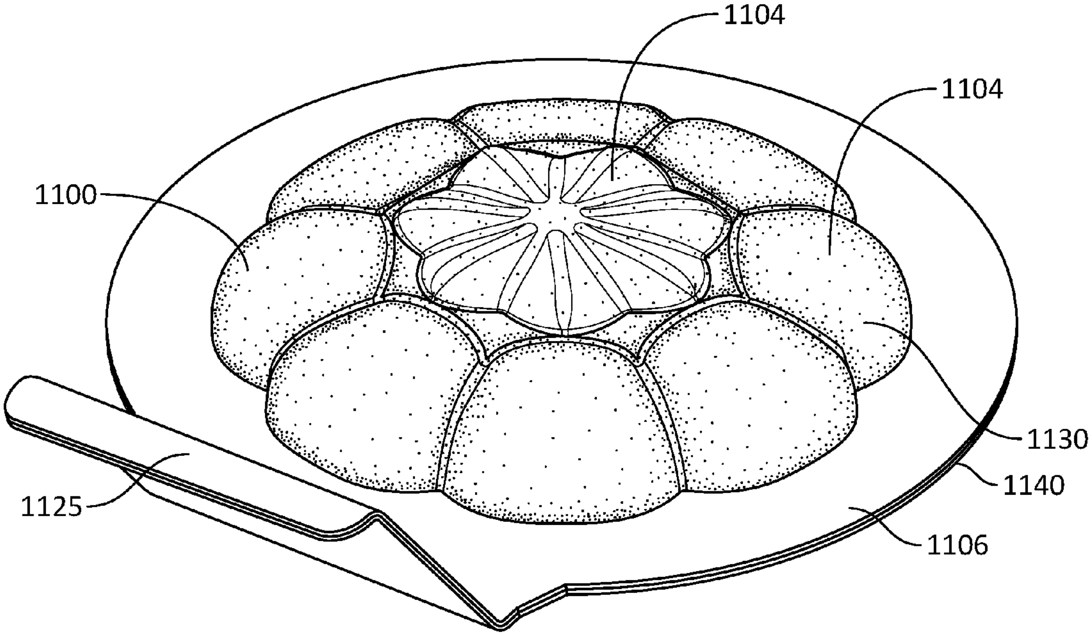
FIG. 11A depicts an isometric view of another exemplary applicator.
Figure 11B:
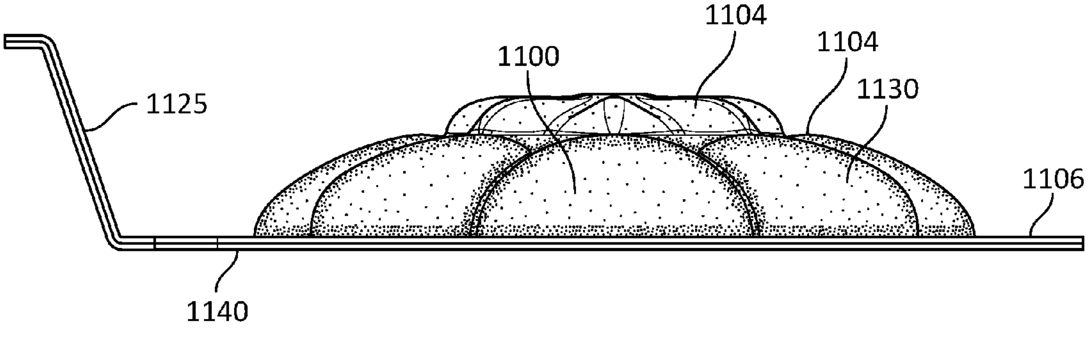
FIG. 11B depicts a side-view of the exemplary applicator of FIG. 11A.

Another exemplary embodiment is depicted in FIGS. 11A and 11B where like reference numerals represent like components. It is understood that this embodiment can incorporate some or all of the aspects from any of the embodiments disclosed herein. Like the embodiment shown in FIGS. 10A and 10B, the applicator 1100 is also formed in a circular shape. However, again other shapes and configurations are contemplated. Like the embodiments shown in FIGS. 9A-10B, a self-adhesive material 1130 is held within the inside recess of the applicator 1100 for dispensing by the user onto the cleaning surface desired to be cleaned. In this embodiment, the self-adhesive material 1130 can be placed into the applicator 1100 such that no air gap is formed between the self-adhesive material 1130 and the applicator 1100. The applicator 1100 includes a side handle 1125 and a flange 1106 for receiving a cover 1140. The side handle 1125 can provide for a degree of flexing of the applicator 1100 when rotated by the user. In particular, the side handle 1125 assists the user when dispensing the self-adhesive material 1130 by permitting the applicator 1100 to flex the dome shape of the applicator 1100 downward and release the self-adhesive material 1130 onto the surface desired to be cleaned.

To apply the self-adhesive material 1130 to the surface desired to be cleaned, first the cover 1140 is removed, and the user can grasp the handle 1125, while pressing on the top surface of the applicator and adhering the self-adhesive material 1130 to the surface desired to be cleaned. Additionally, once the self-adhesive material 1130 is placed into contact with the desired cleaning surface, the handle 1125 can be rotated inward such that the self-adhesive material 1130 dislodges from the applicator 1100 and is applied to the desired cleaning surface. Additionally, once the self-adhesive material 1130 is placed into contact with the desired cleaning surface and the handle 1125 is rotated or tilted inward to flex the applicator 1100, this action assists in dislodging or de-adhering the self-adhesive material 1130 from the applicator 1100 and applying the self-adhesive material 1130 to the desired cleaning surface. Again, the applicator 1100 can be provided with one or more ornamental designs 1104 on the outer surface 1120 of the applicator 1100.

The round shape of the applicators 1000, 1100 can have both functional and ornamental features. For example, the round dome-like shape of the applicators 1000, 1100 may provide for a more even distribution of forces when the applicators 1000, 1100 are pressed up against the desired cleaning surface. For example, the round dome-like shape of the applicators 1000, 1100 can provide for a stiff structure that applies the uniform load of force against the self-adhesive materials 1030, 1130 when applying the self-adhesive materials 1030, 1130 to the surface desired to be cleaned. This structure may also provide a strong force feedback to the user to give a perception to the user that the self-adhesive materials 1030, 1130 are adequately secured to the surface desired to be cleaned.

Additionally, the correspondingly shaped self-adhesive materials 1030, 1130 can uniformly dissolve in a toilet during use. Furthermore, the round shape may help in providing the requisite ratio of weight of the self-adhesive materials 1030, 1130 to surface area of the self-adhesive materials 1030, 1130 for adhering the self-adhesive materials 1030, 1130 to the desired cleaning surface. The round shape of the applicators 1000, 1100 can also be ornamental and ascetically pleasing to the user and entice a user to purchase the product based on the appearance of the applicators 1000, 1100 and the self-adhesive materials 1030, 1130 within the applicators 1030, 1130.

Figure 12A:
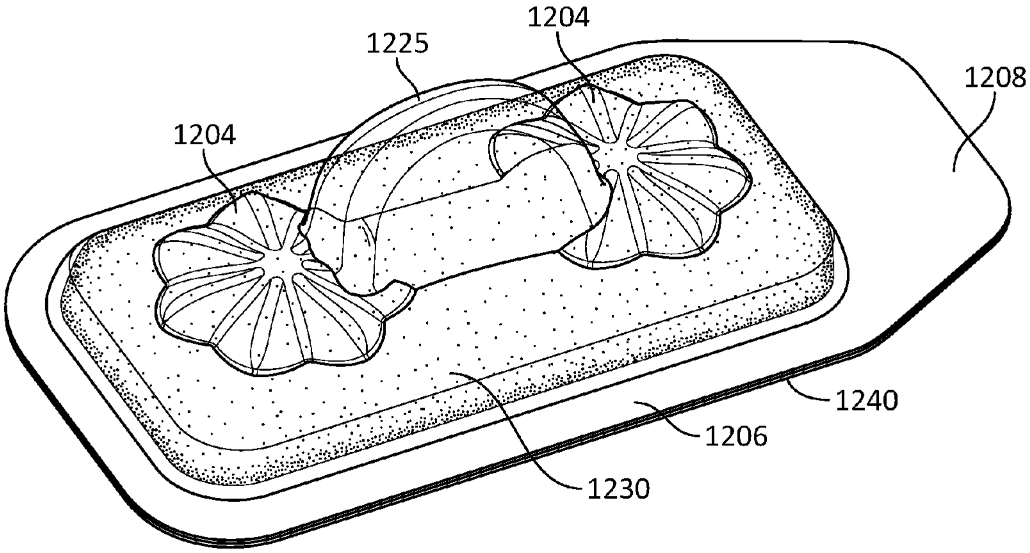
FIG. 12A depicts an isometric view of another exemplary applicator.
Figure 12B:
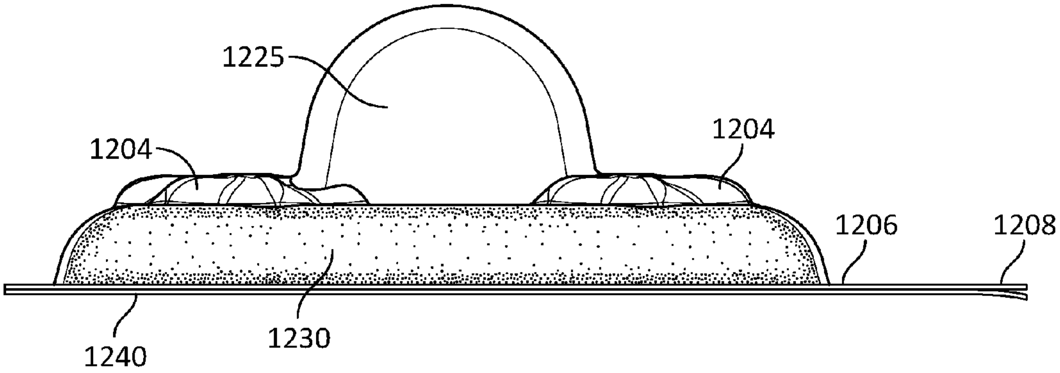
FIG. 12B depicts a side-view of the exemplary applicator of FIG. 12A.

Another exemplary embodiment is depicted in FIGS. 12A and 12B where like reference numerals represent like components. It is understood that this embodiment can incorporate some or all of the aspects from any of the embodiments disclosed herein. In this embodiment, the applicator 1200 is formed in a rectangular shape. However, again other shapes and configurations are contemplated. Like the embodiment shown in FIGS. 9A-9E, a self-adhesive material 1230 is held within the inside area of the applicator 1200 for dispensing by the user onto the surface desired to be cleaned. The applicator 1200 includes a handle 1225 and a flange 1206 for receiving a cover 1240. To apply the self-adhesive material 1230 to the surface desired to be cleaned, first the cover 1240 is removed, and the user can grasp the handle 1225, while pressing on the top surface. Again, the applicator 1200 can be provided with one or more ornamental designs 1204 on the outer surface 1220 of the applicator 1200.

The rectangular shape of the applicator 1200 can have both functional and ornamental features. For example, the rectangular shape of the applicator 1200 may provide a larger surface area for achieving the desired adhesion forces on the desired cleaning surface when the applicator 1200 is pressed up against the desired cleaning surface. The rectangular shape of the applicator 1200 can also be ornamental and ascetically pleasing to the user.

While preferred embodiments and example configurations of the invention have been herein illustrated, shown and described, it is to be appreciated that various changes, rearrangements and modifications may be made therein, without departing from the scope of the invention as defined by the appended claims. It is intended that the specific embodiments and configurations disclosed are illustrative of the preferred and best modes for practicing the invention, and should not be interpreted as limitations on the scope of the invention as defined by the appended claims; it is to be appreciated that various changes, rearrangements and modifications may be made therein, without departing from the scope of the invention as defined by the appended claims.

What is claimed is:

1. An applicator comprising:

an outer surface having a handle configured to apply a self-adhesive material;

an inner surface having an inner recess configured to receive the self-adhesive material; and wherein when the self-adhesive material is placed into the inner recess, the self-adhesive material and the inner surface form a gap between the applicator and the self-adhesive material prior to placement of the self-adhesive material on a surface;

wherein the self-adhesive material is configured to be placed into contact with the inner surface when the self-adhesive material is placed into contact with a surface.

2. The applicator of claim 1, wherein the applicator further comprises a flange extending around the periphery of the applicator and wherein the flange is configured to receive a cover and the flange further comprises an angled portion defining a location for the user to remove the cover to expose the self-adhesive material to a surface.

3. The applicator of claim 1, wherein the inner surface of the applicator is configured to shape the self-adhesive material when the self-adhesive material is placed into contact with the surface.

4. The applicator of claim 3, wherein the inner surface of the applicator comprises an upper region defining a contour that is initially offset from the self-adhesive material and wherein the upper region is configured to at least partially imprint the contour onto the self-adhesive material when the self-adhesive material is applied to the surface.

5. A cleaning apparatus comprising:

a removable self-adhesive material configured to adhere to a surface to be cleaned, the self-adhesive material defining a first surface and a second surface; and an applicator comprising an outer surface having a handle configured to apply the self-adhesive material to the surface; an inner surface having an inner recess configured to receive the self-adhesive material;

wherein when the self-adhesive material is placed into the inner recess of the applicator, the self-adhesive material and the inner surface form an air gap between the applicator and the self-adhesive material prior to the placement of the self-adhesive material on the surface; and wherein the self-adhesive material is configured to be placed into contact with the inner surface when the self-adhesive material is place into contact with the surface;

wherein an adhesive force between the surface to be cleaned and the second surface of the self-adhesive material is configured to be greater than an adhesive force between the first surface of the self-adhesive material and the applicator and wherein the adhesive force between surface to be cleaned and the second surface of the self-adhesive material is configured to remove the self-adhesive material from the applicator.

6. The cleaning apparatus of claim 5, wherein the applicator further comprises a flange extending around the periphery of the applicator and wherein the flange is configured to receive a cover and the flange further comprises an angled portion defining a location for the user to remove the cover to expose the self-adhesive material to the surface.

7. The cleaning apparatus of claim 5, wherein the inner surface of the applicator is configured to shape the self-adhesive material when the self-adhesive material is placed into contact with the surface.

8. The cleaning apparatus of claim 5, wherein the inner surface of the applicator comprises an upper region defining a contour that is initially offset from the self-adhesive material and wherein the upper region is configured to at least partially imprint the contour onto the self-adhesive material when the self-adhesive material is applied to the surface.

9. The cleaning apparatus of claim 5, wherein the self-adhesive material further comprises a release layer placed on the first surface of the self-adhesive material.

10. The cleaning apparatus of claim 8, wherein the release layer is placed on a portion of the first surface of the self-adhesive material.

11. The cleaning apparatus of claim 9, wherein the release layer exposes an edge portion of the self-adhesive material.

12. A method for forming a cleaning apparatus comprising:

providing a removable self-adhesive material and configuring the self-adhesive material to adhere to a surface to be cleaned, the self-adhesive material defining a first surface and a second surface;

providing an applicator comprising an outer surface having a handle and configuring the applicator to apply the self-adhesive material to the surface to be cleaned, providing an inner surface in the applicator having an inner recess configured to receive the self-adhesive material;

placing the self-adhesive material into the inner recess of the applicator such that the self-adhesive material and the inner surface form an air gap between the applicator and the self-adhesive material prior to the self-adhesive material being place into contact with the surface; and configuring the self-adhesive material to be placed into contact with the inner surface of the applicator when the self-adhesive material is placed into contact with the surface; and wherein an adhesive force between the first surface of the self-adhesive material and the applicator is greater than the weight of the self-adhesive material and wherein an adhesive force between the surface to be cleaned and the second surface of the self-adhesive material is greater than the adhesive force between the first surface of the self-adhesive material and the applicator.

13. The method of claim 12, further comprising providing the applicator with a flange extending around the periphery of the applicator and configuring the flange to receive a cover and providing the flange with an angled portion defining a location for the user to remove the cover to expose the self-adhesive material to a surface.

14. The method of claim 12, further comprising configuring the inner surface of the applicator to shape the self-adhesive material when the self-adhesive material is placed into contact with a surface.

15. The method of claim 12, further comprising providing the inner surface of the applicator with an upper region defining a contour that is initially offset from the self-adhesive material and wherein the upper region is configured to at least partially imprint the contour onto the self-adhesive material when the self-adhesive material is applied to the surface.

16. The method of claim 12, further comprising providing the self-adhesive material with a release layer placed on the first surface of the self-adhesive material.

17. The method of claim 16, further comprising placing the release layer on a portion of the first surface of the self-adhesive material.

18. The method of claim 17, further comprising exposing an edge portion of the self-adhesive material with the release layer.

19. The applicator of claim 1 wherein the inner recess proximate to the gap defines surface ornamentation and wherein when the self-adhesive material is placed into contact with the surface, the surface ornamentation is molded onto the self-adhesive material.

20. The cleaning apparatus of claim 5 wherein the inner recess proximate to the air gap defines surface ornamentation and wherein when the self-adhesive material is placed into contact with the surface, the surface ornamentation is molded onto the self-adhesive material.

21. The method of claim 12 wherein the inner recess proximate to the air gap defines surface ornamentation and molding the surface ornamentation onto the self-adhesive material when the self-adhesive material is placed into contact with the surface.

22. The applicator of claim 1 further comprising undercuts on the inner surface and wherein the undercuts are configured to move away from the self-adhesive material to allow the self-adhesive material to be transferred to the surface.

23. The cleaning apparatus of claim 5 wherein the applicator further comprises undercuts on the inner surface and wherein the undercuts are configured to move away from the self-adhesive material to allow the self-adhesive material to be transferred to the surface.

24. The method of claim 12 further comprising providing the applicator with undercuts on the inner surface and wherein the undercuts are configured to move away from the self-adhesive material to allow the self-adhesive material to be transferred to the surface.

25. The applicator of claim 1 wherein the gap is formed between the inner surface and a top surface of the self-adhesive material.

26. The cleaning apparatus of claim 5 wherein the air gap is formed between the inner surface and the first surface of the self-adhesive material.

27. The method of claim 12 wherein the air gap is formed between the inner surface and the first surface of the self-adhesive material.

28. The applicator of claim 1 wherein the gap is a side gap formed between a side portion of the self-adhesive material and a side portion of the applicator.

29. The cleaning apparatus of claim 5 wherein the air gap is a side air gap formed between a side portion of the self-adhesive material and a side portion of the applicator.

30. The method of claim 12 wherein the air gap is a side air gap formed between a side portion of the self-adhesive material and a side portion of the applicator.

* * * * *